US008626407B2

(12) United States Patent
Fujimoto

(10) Patent No.: US 8,626,407 B2
(45) Date of Patent: Jan. 7, 2014

(54) WORK VEHICLE

(75) Inventor: Hiroo Fujimoto, Sakai (JP)

(73) Assignee: Kubota Corporation, Osaka (JP)

(*) Notice: Subject to any disclaimer, the term of this patent is extended or adjusted under 35 U.S.C. 154(b) by 30 days.

(21) Appl. No.: 13/424,446

(22) Filed: Mar. 20, 2012

(65) Prior Publication Data

US 2013/0030660 A1 Jan. 31, 2013

(30) Foreign Application Priority Data

Jul. 26, 2011 (JP) ................................ 2011-163488
Jul. 28, 2011 (JP) ................................ 2011-165754

(51) Int. Cl.
*G06F 17/00* (2006.01)
*G06F 3/048* (2013.01)

(52) U.S. Cl.
USPC ........................................ 701/50; 715/851

(58) Field of Classification Search
USPC ......... 701/1, 50, 57, 34.2; 715/273, 700, 761, 715/764, 851; 345/156
See application file for complete search history.

(56) References Cited

U.S. PATENT DOCUMENTS

2005/0222726 A1* 10/2005 Furui et al. ...................... 701/36
2007/0126698 A1* 6/2007 Iwamoto et al. ............... 345/156
2008/0300731 A1* 12/2008 Nakajima et al. ................. 701/1

FOREIGN PATENT DOCUMENTS

| JP | 2005255134 A | 9/2005 |
| JP | 2008162337 A | 7/2008 |
| JP | 2009143456 A | 7/2009 |
| JP | 201013060 A | 1/2010 |

* cited by examiner

*Primary Examiner* — Mary Cheung
(74) *Attorney, Agent, or Firm* — The Webb Law Firm

(57) ABSTRACT

A work vehicle is disclosed with an information displaying device preventing set information corresponding to a setting screen displayed on a display from being erroneously changed even while permitting an operation for switching to and displaying one among a plurality of set screens on the display. A setting information processing unit of the information displaying device includes setting screen displaying means for switching the setting screen by the input of a first operation information item and displaying same in a transition display mode, and setting information changing means for performing a process in an information change mode for permitting a change to the set information corresponding to the setting screen, by inputting of a second operation information item. When it is determined that the second operation information item is inputted in the information change mode, a process for restoring the transition display mode from the information change mode is performed.

6 Claims, 14 Drawing Sheets

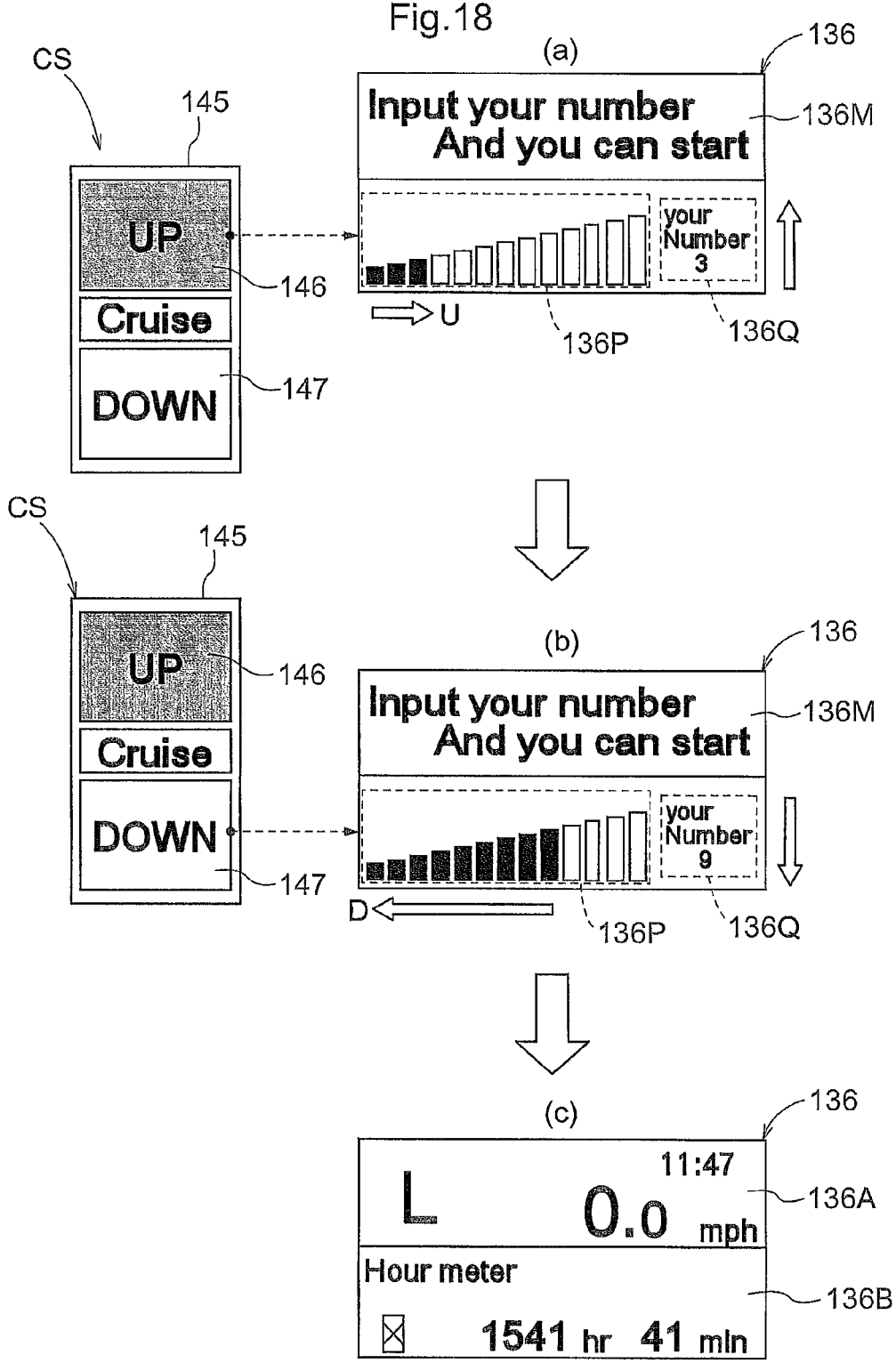

WORK VEHICLE

BACKGROUND OF THE INVENTION

1. Field of the Invention

The present invention relates to a work vehicle such as a tractor.

2. Description of the Related Art

[1] In a work vehicle, a setting screen selected by a setting information processing unit provided to an information displaying device thereof from among a plurality of set screens corresponding to a plurality of information items is displayed on a display, and the set information corresponding to the selected setting screen is changed.

For example, Japanese Laid-open Patent Publication 2009-143456 (JP 2009-143456 A) discloses a configuration comprising a display (a display unit in JP 2009-143456 A) for displaying various different information items of a vehicle body, a switch operational tool for switching the screen displayed on the display, and a setting operational tool for performing various different settings.

In JP 2009-143456 A, a plurality of basic screens can be switched by a switch operational tool and the display of the basic screen makes it possible to understand needed information from the screen. When, in a situation where a basic screen is being displayed, a setting button is operated, the selected screen corresponding to the basic screen is thereby displayed, and the display is made to display an operation guide for guiding the selection of a setting item being displayed on the selection screen. In a situation where both the selection screen and the operation guide are being displayed in this manner, it is possible to select a setting item and perform a setting by following the operation guide, and operating a change operational tool after such a setting makes it possible to complete the setting processing.

Japanese Laid-open Patent Publication 2010-013060 (JP 2010-013060 A) discloses a configuration (an information display system for a vehicle) in which a meter includes a display and with an operation input unit which can be operated by being pressed. In such a configuration, the display content is switched sequentially in a fixed sequence each time the operation input unit is pressed briefly (for example, for less than five seconds), and, when the operation input unit is pressed for a long time (for example, for at least five seconds), a sub-menu for selecting a desired change input screen from a plurality of change input screens is displayed. Within the sub-menu, when the operation input unit is pressed briefly, a cursor for indicating a change input menu is thereby sequentially moved, it being then possible to select a change input menu; when the operation input unit is pressed for a long time, an underlying sub-menu is thereby displayed and the setting content can be changed. The inputted content is confirmed and the sub-menu screen is restored when a operation-free state continues beyond an input confirmation interval (for example, for five seconds) after a change setting is inputted by the operation of the operation input unit in the change input screen.

In JP 2010-013060 A, when a single operation input unit constituted of the press-operated type is press-operated for only a short period of time, the display content of a display is thereby sequentially switched, and when the operation input unit is press-operated for a long period of time, the setting content is thereby changed.

As disclosed in JP 2009-143456 A and JP 2010-013060 A, the operation of switching the display content of the display by an operation performed by a worker makes it possible to understand the work situation from the display of the display, and to check a setting value, the operating situation of various machines, and the like.

The ability to change a setting by an operation involving a specific switch, as disclosed in JP 2009-143456 A, also sometimes leads to a false setting when the switch is operated mistakenly, for example, when the worker is unaware that the setting is being changed. In particular, setting the unit when fuel consumption is displayed, setting an operating mode when various machines are operated, clearing the value(s) of a trip meter, and other such operations are not very frequently performed, and setting by a service technician is preferred.

In view whereof, changing the mode of operation, as disclosed in JP 2010-013060 A, presumably renders it more difficult for a setting to be changed; however, as in JP 2010-013060 A, the screen is switched when the operation input unit is press-operated briefly, and a move is made to a screen making it possible to change a setting when the operation input unit is press-operated for a long time; even though the inputted content is confirmed by the elapsing of a period of time thereafter, it is impossible to avoid a false setting, and there remains room for improvement.

One object of the present invention is to provide a reasonable configuration for an information displaying device for suppressing the defect where set information corresponding to a setting screen displayed on a display is mistakenly changed while permitting an operation for switching to and displaying on a display a single one of a plurality of set screens.

[2] In a work vehicle, there is sometimes provided an authentication processing unit for allowing an engine to be started only when memory authentication information, which is pre-stored, and inputted authentication information, which is inputted, are identical to each other.

For example, in Japanese Laid-open Patent Publication 2008-162337 (JP 2008-162337 A), a configuration is such that a plurality of operation switches arranged on an operation panel can be used for password input switching; after an engine is started, when the plurality of operation switches is operated in a set sequence, the inputted sequence is understood to be a password, and continuous driving of the engine becomes possible when the password is identical to a previously set password.

In JP 2008-162337 A, the plurality of operation switches is to be used during work, and there is provided a controller (corresponding to an authentication processing unit) for acquiring information on the operation switches. A password (corresponding to authentication information) is set in a memory of the controller, and, when the inputted password (the sequence of operation of the plurality of operation switches) is identical to a previously set password, then, as described above, continuous driving of the engine is rendered possible, while when the passwords are not identical, then the controller performs a control for stopping the engine to prevent theft.

In Japanese Laid-open Patent Publication 2005-255134 (JP 2005-255134 A), the number of iterations where an engine key switch for starting an engine is operated to a start position is inputted as a cipher number, it being rendered possible to send power to a starter motor and start the engine only when the inputted cipher number is identical to a pre-set number of iterations.

JP 2005-255134 A discloses a configuration in which a signal system into which a signal from the engine key switch is inputted is provided to a theft prevention device (corresponding to the authentication processing unit) having a central processing unit (CPU), the cipher number (corresponding to the authentication information) being stored in an electrically erasable programmable read-only memory (EEPROM) of the theft prevention device. Thereby, it becomes possible to start the engine when the number of iterations where the engine key switch is operated to the start position is identical to the authentication number, and it becomes impossible to start the engine when the numbers are not identical, thus preventing theft.

Japanese Laid-open Patent Publication 2008-162337 (JP 2008-162337 A) discloses a configuration in which, when a pre-existing plurality of operation switches is operated, an authentication is thereby executed; when the number of operation switches used in the authentication is increased in order to enhance the precision of the authentication, more effort and time are needed, because the hands are moved more when the plurality of operation switches is operated. In contrast thereto, Japanese Laid-open Patent Publication 2005-255134 (JP 2005-255134 A) discloses a configuration in which the precision of the authentication is enhanced even while only a single engine key switch is to be used.

However, performing the authentication based on the number of iterations where a single switch is operated, as in the configuration of JP 2005-255134 A, also has limitations on enhancing the precision of the authentication, and there remains room for improvement.

One object of the present invention is to provide a reasonable configuration for a work vehicle for enhancing the precision of an authentication when an engine is to be started, while using a smaller number of switches.

SUMMARY OF THE INVENTION

In particular, the above object noted in previous section [1] is fulfilled by one aspect of a work vehicle according to the invention, as under:—

A work vehicle comprising:
a display; and
an information displaying device, the information displaying device including: a setting information processing unit for displaying, on the display, a setting screen selected from among a plurality of set screens corresponding to a plurality of information items, and for changing the set information corresponding to the selected setting screen; and operation information discriminating means for determining a first operation information item and a second operation information item inputted by a manual operation;
wherein the setting information processing unit includes:
setting screen displaying means for displaying the setting screen on the display; and
setting information changing means for allowing changing of the set information when the setting screen is displayed on the display;
wherein when the operation information discriminating means determines that the first operation information item is inputted, the setting screen displaying means performs display processing in a transition display mode for sequentially switching to, and displaying one of the plurality of set screens on the display each time an input is determined; and
wherein when the operation information discriminating means determines that the second operation information item is inputted during display in the transition display mode, the setting information changing means performs a process for moving to an information change mode for allowing changing of the set information corresponding to the setting screen being displayed on the display; and when the operation information discriminating means determines that the second operation information item is inputted during the information change mode, the setting information changing means performs a process for restoring the transition display mode from the information change mode.

According to such a configuration, the display processing in the transition display mode for switching to, and displaying on the display, the one among the plurality of set screens each time the setting screen displaying means determines an input is performed when the operation information discriminating means determines that the first operation information has been inputted, and the setting information changing means moves on to the information change mode for allowing changing of the set information corresponding to the setting screen already having been displayed on the display when the operation information discriminating means determines that the second operation information item has been inputted. After the set information has been changed in the information change mode, the transition display mode is restored when the operation information discriminating means determines that the second operation information item has been inputted.

In other words, the setting screen is switched by the input by the first operation information item, and the input of the second operation information item renders it possible to change the set information corresponding to the setting screen. This makes it possible to eliminate the defect in which the set information is changed by a mistaken operation, because when the set information is to be changed by the setting screen, a worker consciously inputs the second operation information item, a move being thereby made to the information change mode, and after having changed the set information in the information change mode, the worker then consciously inputs the second operation information item.

Consequently, there is configured an information displaying device for suppressing the defect where set information corresponding to a setting screen displayed on a display is mistakenly changed, while permitting an operation for switching, and displaying on a display, a single one of a plurality of set screens.

According to a preferred aspect, when the operation information discriminating means determines that the first operation information item is inputted during the information change mode, the setting information changing means changes the set information corresponding to the setting screen each time an input is determined.

With the above configuration, because the set information is changed by the inputting of the first operation information item after a move has been made to the information change mode, the set information is changed by an operation that is simpler than, for example, an operation configuration for inputting numerical information or character information from a keyboard.

According to a preferred aspect, the work vehicle further comprises: storage means, wherein when the operation information discriminating means determines that the second operation information item is inputted during the information change mode, the set information changed during the information change mode is stored into the storage means.

With the above configuration, after the second operation information item has been inputted, the transition display mode is restored after the set information having been changed is stored in the storage means, thus obviating the need for specially performing an operation for storing the set information in the storage means.

According to a preferred aspect, the work vehicle further comprises a push switch, wherein the operation information discriminating means determines if the first operation information item is inputted or not when a period of time of operation by the push switch is less than a set of period of time, and determines if the second operation information item is inputted or not when the period of time of operation by the push switch is the set of period of time or longer.

With the above configuration, adjusting the length of press-operation time of the push switch makes it possible to input the first operation information item and the second operation information item, thus rendering it possible to input two different kinds of operation information without needing to provide two switches.

According to a preferred aspect, the work vehicle further comprises a first switch and a second switch, wherein the operation information discriminating means determines if the first operation information item is inputted or not when the first switch has been operated, and determines if the second operation information item is inputted or not when the second switch has been operated.

With the above configuration, it is possible to use the two switches to separately input the first operation information item and the second operation information item, thus rendering it possible to input two different kinds of operation information with a simple operation.

According to a preferred aspect, the work vehicle further comprises a first switch, a second switch and a single operational tool for operating the first switch and the second switch, wherein the operation information discriminating means determines if the first operation information item is inputted or not when the first switch is operated by the operational tool, and determines if the second operation information item is inputted or not when the second switch is operated by the operational tool.

With the above configuration, it becomes possible to select and operate the first switch and the second switch without bringing the hand from the single operational tool, and a worker can readily perform an operation without needing to substantially move the hand while operating, in comparison to when the first switch and the second switch are arranged at separated positions.

In particular, the above object noted in previous section [2] is fulfilled by one aspect of a work vehicle according to the invention, as under:—

A work vehicle, comprising:
an engine;
an authentication processing unit for permitting the engine to be started only when stored authentication information and authentication information inputted by a manual operation are identical to each other;
storage means for pre-storing the stored authentication information; and
a first switch and a second switch for performing the manual operation,
wherein the stored authentication information is the number of operation iterations of the first switch and the number of operation iterations of the second switch, at least one of the number of operation iterations of the first switch and the number of operation iterations of the second switch being set to at least two, and the authentication processing unit being configured to acquire, as the inputted authentication information, the number of operation iterations of the first switch and the number of operation iterations of the second switch;
authentication information identifying means for comparing the inputted authentication information acquired by the authentication processing unit with the stored authentication information; and
power controlling means for allowing power to be supplied to a starter motor of the engine when the inputted authentication information is identical to the stored authentication information at the authentication information identifying means.

According to such a configuration, the number of combinations of operations of the two switches is increased, because the stored authentication information is constituted of the combination of the number of operation iterations of the first switch and the number of operation iterations of the second switch, and at least one of the number of operation iterations of the first switch and the number of operation iterations of the second switch is at least twice. For this reason, it becomes difficult for a person attempting to start up the engine in order to steal the work vehicle to perform an operation identical to the stored authentication information, even by operating the two switches at random. Further, when the first switch and the second switch are operated only the appropriate number of iterations, the authentication information identifying means acquires the number of operation iterations of the first switch and the number of operation iterations of the second switch as the inputted authentication information and confirms the conformity thereof with the stored authentication information having been stored in the storage means, and the power controlling means allows power to be supplied to the starter motor of the engine, it being thereby rendered possible to start up the engine.

With the above configuration, provided is a work vehicle in which the precision of the authentication when the engine is to be started up is enhanced even while a small number of switches is being used, and in which an inappropriate start of the engine can be suppressed and theft can be prevented.

According to a preferred aspect, the work vehicle further comprises: operation iteration number displaying means for displaying, on a display, the number of operation iterations of the first switch and the number of operation iterations of the second switch.

With the above configuration, the number of operation iterations can be accurately understood from the display, whereby a false operation can be eliminated even in a situation where, as the stored authentication information, the number of operation iterations of the first switch and the number of operation iterations of the second switch are set so as to be numerous.

According to a preferred aspect, the first switch and the second switch are configured to be operable by a single operational tool.

With the above configuration, when the first switch and the second switch are to be operated, there is no need to remove a finger from the single operational tool, allowing for more rapid input of the authentication information than in a configuration for operating by bringing a finger into contact with two switches separately.

According to a preferred aspect, the work vehicle further comprises: authentication restricting means for not allowing the authentication processing unit to provide authentication when the authentication information identifying means determines, for a set number of times of consecutive iterations, that the inputted authentication information is not identical to the stored authentication information, until a set period of time elapses thereafter.

With the above configuration, when it is decided at the authentication information identifying means for a set number of times of consecutive iterations that the inputted authentication information and the stored authentication information are not identical, the authentication restricting means does not allow the authentication information identifying means to provide authentication; even when, for example, a person attempting to steal the work vehicle has inputted authentication information (the inputted authentication information) at random, since the number of input iterations of the authentication information (inputted authentication information) is restricted, it is rendered difficult to input authentication information (inputted authentication information) identical to the stored authentication information, thus enhancing the precision of the authentication.

Other features as well as advantageous effects arising from such features will be apparent upon reading the detailed description as under, with reference to the accompanying drawings.

BRIEF DESCRIPTION OF THE DRAWINGS

FIG. 1 is an overall lateral side view of a tractor illustrated as one example of the work vehicle;

FIG. 2 is a plan view of an operation unit;

FIG. 3 is a drawing illustrating a configuration of a meter panel unit;

FIG. 4 is a block circuitry diagram illustrating a control configuration;

FIG. 5 is a view illustrating a configuration of a cruise switch;

FIG. 6 is a flowchart illustrating display processing by an information displaying device;

FIG. 7 is a view illustrating screens to be displayed in this sequence on a display in a transition display mode;

FIG. 8 is a view illustrating a transition of the display of a power takeoff (PTO) meter;

FIG. 9 is a view illustrating a transition of the display of a speed change response setting screen;

FIG. 10 is a view illustrating a transition of the display of a diesel particulate filter (DPF) setting screen; and FIG. 11 shows a transition of the display of a speed change mode setting screen; and FIGS. 12-18 show a second embodiment of a work vehicle, in which:—

FIG. 12 is an overall lateral side view of a tractor illustrated as one example of the work vehicle;

FIG. 13 is a plan view of an operation unit;

FIG. 14 is a view illustrating a configuration of a meter panel unit;

FIG. 15 is a block circuitry diagram illustrating a control configuration;

FIG. 16 is a view illustrating a configuration of a cruise switch;

FIG. 17 is a flowchart illustrating a control mode of authentication processing; and FIG. 18 is a view illustrating a display aspect of a display during the operation of the cruise switch.

DESCRIPTION OF THE PREFERRED EMBODIMENTS

There follows a description of embodiments of the work vehicle, with reference to the accompanying drawings, in which a tractor serves as an example of the work vehicle.
[First Embodiment]
(Overall Configuration)

Figure 1:
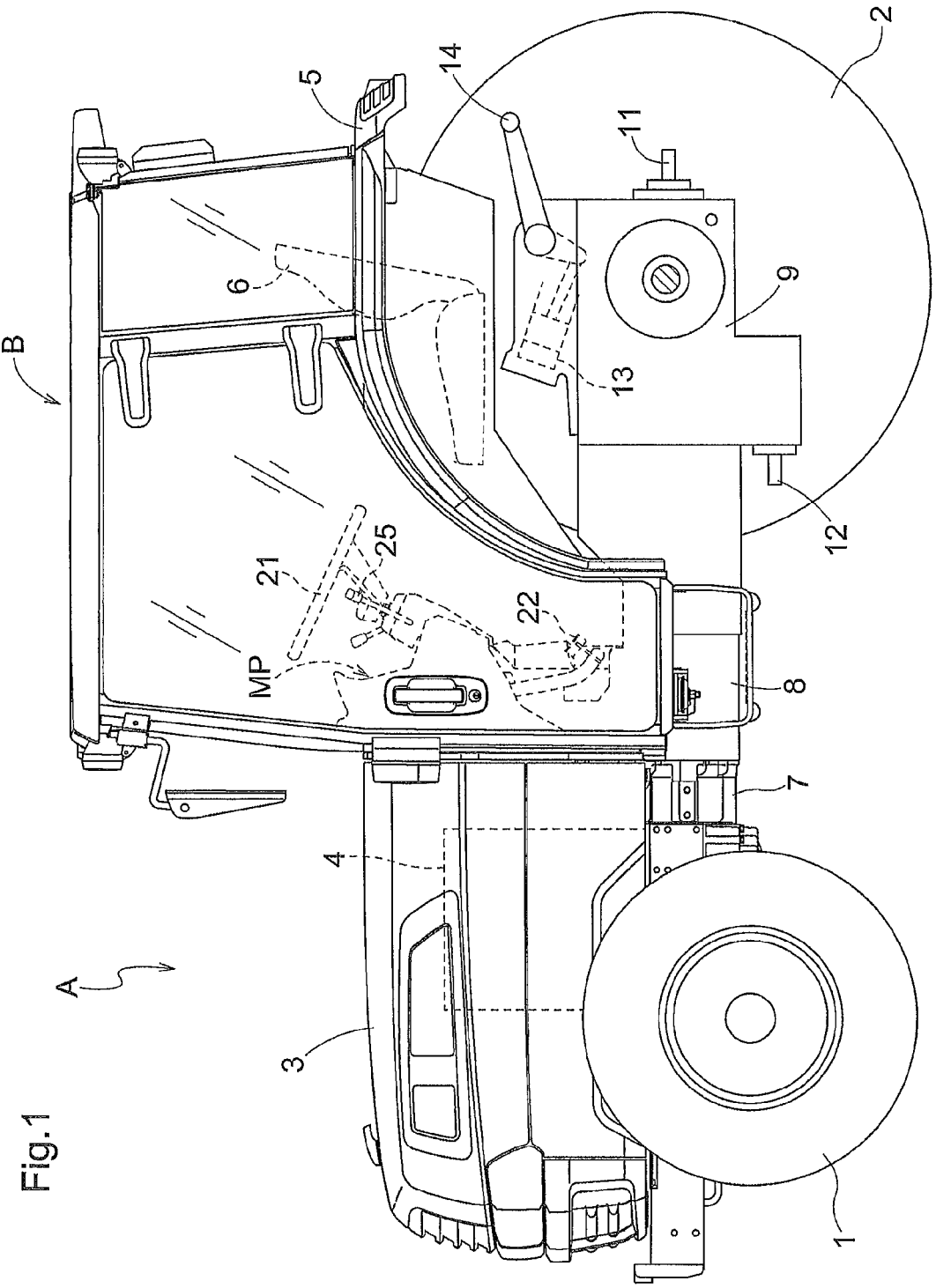
FIGS. 1-11 show a first embodiment of a work vehicle, in which:—

As shown in FIG. 1, the tractor is configured to comprise a pair of right/left front vehicle wheels 1 and a pair of right/left rear vehicle wheels 2, each acting as a travel device for a travel vehicle body A; a diesel engine 4 housed within an engine hood 3 of a front part of the travel vehicle body A; an operation seat 6 arranged at a middle position between right and left rear wheel fenders 5 for constituting an operation unit; and a cabin B for surrounding the operation unit.

In the tractor, a clutch housing 7, a hydrostatic stepless speed change device (HST) 8 and a transmission case 9 are connected one after another in the stated sequence toward a rear side of the engine 4. The transmission case 9 is arranged under the operation seat 6. These components form a transmission system for transmitting drive force from the transmission case 9 to the right/left front vehicle wheels 1 and the right/left rear vehicle wheels 2, to thereby form a four-wheel-driven type tractor.

A rear PTO shaft 11 is provided at a rear end of the transmission case 9. A mid PTO shaft 12 is provided on a bottom of the transmission case 9. A hydraulic lift cylinder 13 is provided at an upper position of the transmission case 9. A pair of right/left lift arms 14 are provided at a rear end of the transmission case 9 to be vertically pivotal by the lift cylinder 13. Though not depicted in the drawings, the tractor is configured such that a rotary tiller device, a plow or other ground working implement may be connected to the rear end of the travel vehicle body A via a three-point link mechanism, whereby the ground working implement can be vertically moved by the lift cylinder 13.

When a rotary tiller device is connected, tilling work is performed by driving rotary claws of the rotary tiller device which claws are driven under the drive force from the rear PTO shaft 11. When a lawn-mowing device or other mid-mount ground working implement is connected to a middle position between the front vehicle wheels 1 and the rear vehicle wheels 2, the ground work by the ground working implement is performed under the drive force from the mid PTO shaft 12.
(Operation Unit)

Figure 2:
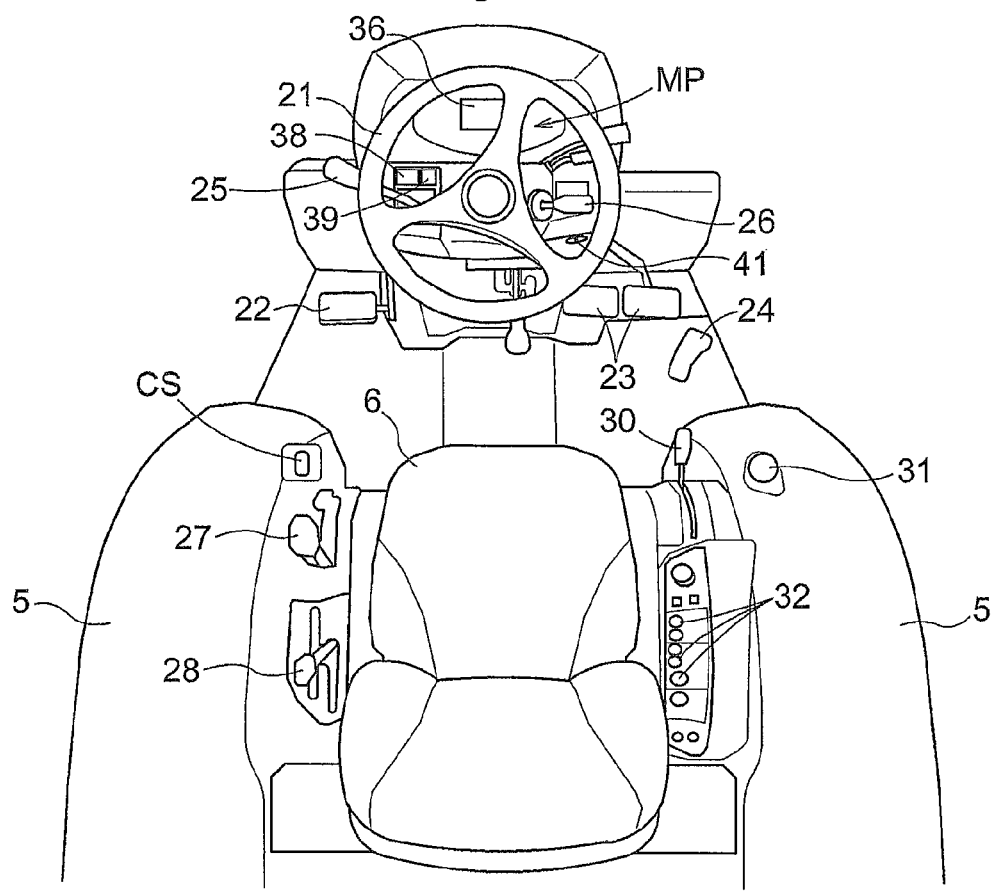

The cabin B has a typical structure including: a roof on an upper part thereof; a front glass on a front part thereof; doors formed of transparent glass or transparent resin on the right/left sides thereof to be openable and closable; and a rear glass on a rear part thereof. As shown in FIG. 2, a steering wheel 21 is arranged at a front position of the operation seat 6 within the cabin B for performing a steering operation. A clutch pedal 22 is arranged on the left side of a lower position of the steering wheel 21. Two brake pedals 23 are arranged on the right side, as well as a speed change pedal 24. A forward/reverse switching lever 25 and a forcible lift lever 26 are provided in the vicinity of the steering wheel 21, the forward/reverse switching lever 25 performing selection between the forward travel and the reverse travel of the travel vehicle body A, and the forcible lift lever 26 performing selection of states of the ground working implement, which is connected to the rear end of the travel vehicle body A, between a lowered working level and a raised set level.

A main speed change lever 27, an auxiliary speed change lever 28, and a cruise switch CS are arranged on a left side of the operation seat 6. A position control lever 30 for setting a swing angle each of the lift arms 14 relative to the vehicle body; a PTO switch 31 for selecting the drive between the rear PTO shaft 11 and the mid PTO shaft 12; and a plurality of operation switches 32 are arranged on a right side of the operation seat 6.

Figure 5:
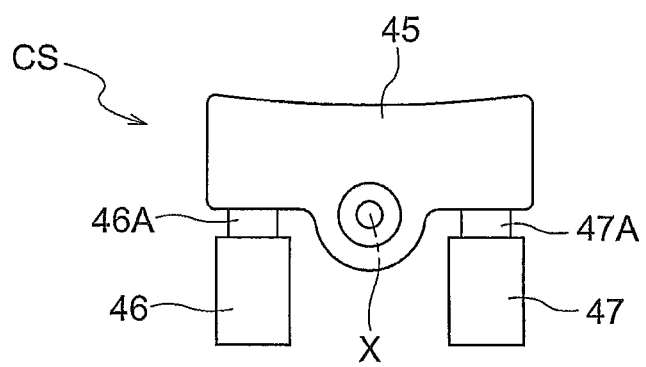

As shown in FIG. 5, the cruise switch CS is configured such that a single operational tool 45 can be used for a manual operation each of the first switch 46 and the second switch 47. The operational tool 45 is supported to be pivotable around an axis X. The operational tool 45 is supported to be swingable in a seesaw manner so as to maintain a neutral posture in non-operational state, to swing to one side when one end part (toward the first switch 46) is operated and to swing to the other side when another end part (toward the second switch 47) is operated. A first operation body 46A, which is urged so as to protrude, is provided to the first switch 46, and a second operation body 47A, which is urged so as to protrude, is provided to the second switch 47; the first operation body 46A and the second operation body 47A come into contact with a rear surface side of the operational tool 45, and the operational tool 45 is thereby maintained at the neutral posture. A spring for urging the operational tool 45 to a neutral position may also be provided.

The cruise switch CS is configured such that a light (shallow) operation of each of the end parts brings a first-stage switch part of either the first switch 46 or the second switch 47 into an ON state, and a strong (deep) operation brings a second-stage switch part into an ON state. Such a configuration makes it possible to operate the first-stage switch part and second-stage switch part of the first switch 46 to be on by adjusting the force of the press-operation on one end part of the operational tool 45, and possible to operate the first-stage switch part and second-stage switch part of the second switch 47 to be on by adjusting the force of the press-operation on the other end part of the operational tool 45.

Figure 4:
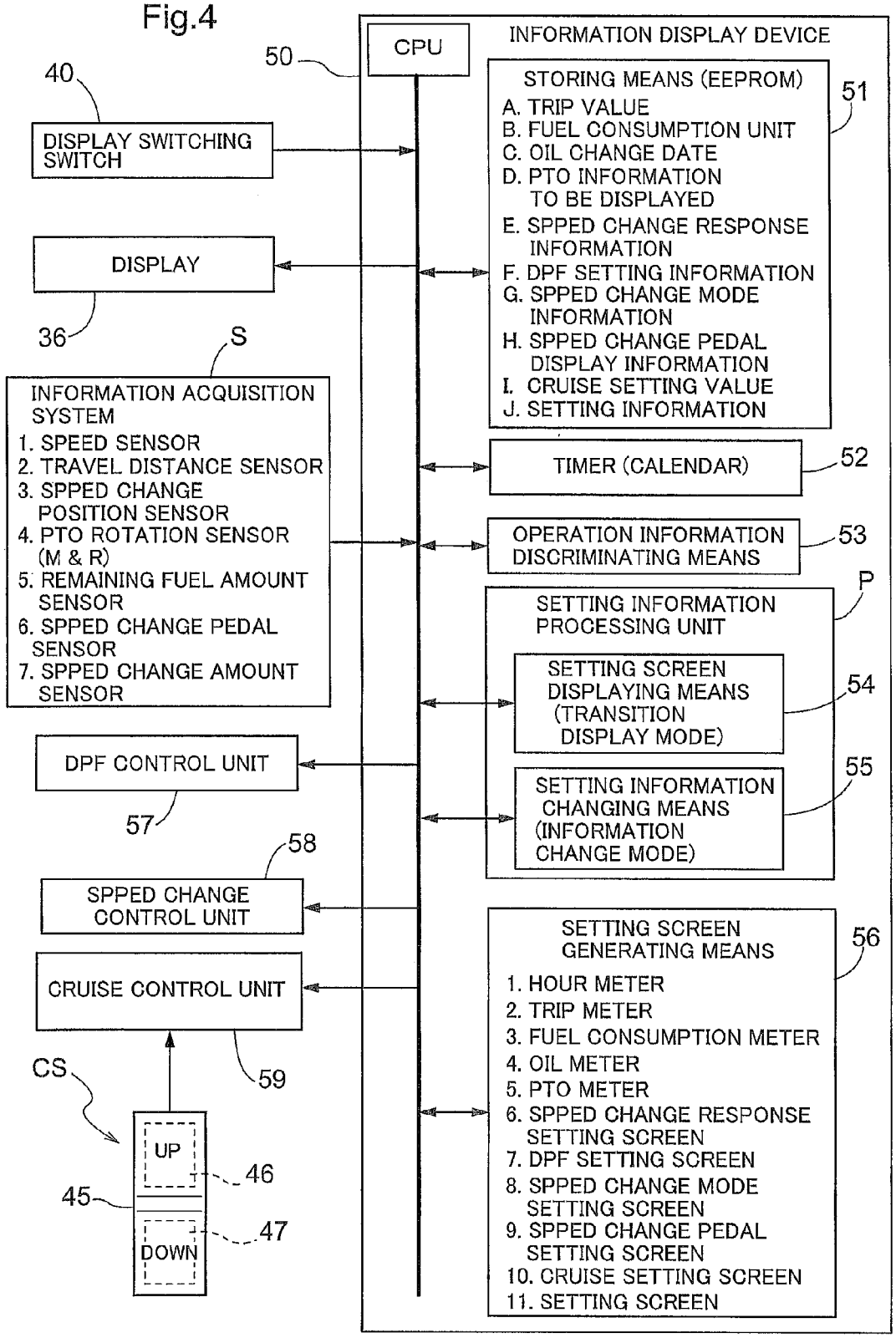

Although the control configuration is not depicted in the drawings, the stepless speed change device 8 includes a speed change actuator for rotating a speed change operation shaft of the stepless speed change device 8, and a speed change amount sensor for measuring the amount of the rotation operation of the speed change operation shaft. A cruise control unit 59 (e.g. a speed change ECU) shown in FIG. 4 is configured such that a signal from the speed change amount sensor is fed back and an actuator is controlled. The cruise control unit 59 has an output system for controlling the aforesaid speed change actuator, the signal of the speed change amount sensor is fed back, and a signal from the first switch 46, a signal from the second switch 47 and a control signal from an information displaying device 50 are inputted.

When the travel vehicle body A is made to travel, a control mode is set such that a strong (deep) operation of the end part of the operational tool 45 of the cruise switch CS, the end side being marked "UP," moves to a cruise control, and such that a strong (deep) operation of an end side of the operational tool 45 marked "DOWN" stops the cruise control. When the move to cruise control is first made, travel is performed at a pre-set cruise speed (a speed corresponding to a set cruise value stored in storage means 51 shown in FIG. 4), and a control mode of a cruise control device is set such that, during the cruise control, a light (shallow) operation of the end side of the operational tool 45 marked "UP" boosts the cruise speed only by a set value at each operation, and a light (shallow) operation of the end side of the operational tool 45 marked "DOWN" lowers the cruise speed only by a set value at each operation.

Figure 3:
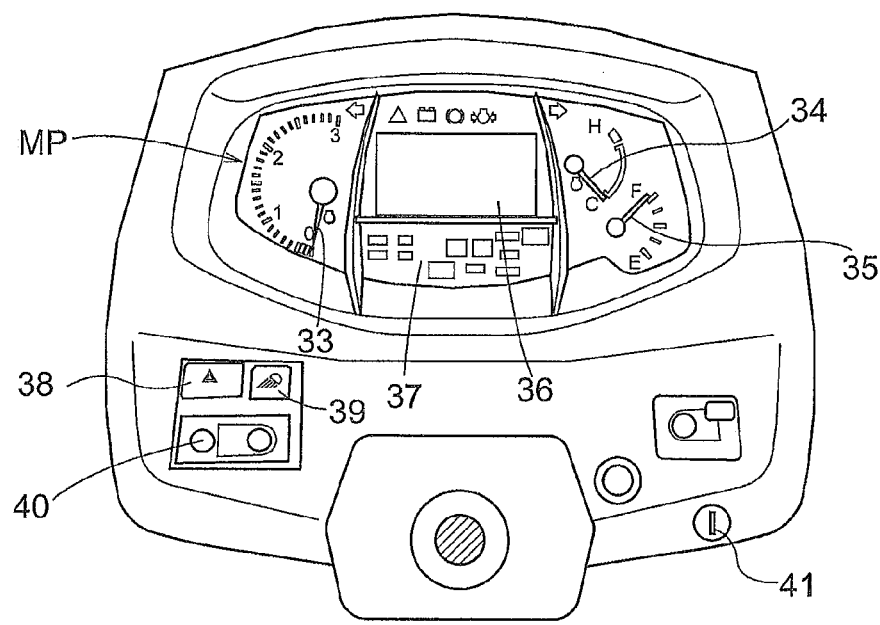

As shown in FIG. 3, a meter panel MP is arranged at a front position of the steering wheel 21; on the meter panel MP, an engine rotation rate meter 33 is arranged on the left side, a cooling water temperature meter 34 and a remaining fuel amount meter 35 are arranged on the right side, a liquid crystal display 36 for displaying information is arranged in the middle, and an information announcing unit 37 for announcing the situations of various different machines by lighting a lamp is formed below the display 36.

A hazard switch 38, a lamp switch 39 for lighting headlights and the like, and a push-switch style display switching switch 40 are arranged to the left side below the meter panel MP; and a key switch 41 is arranged to the right side below the meter panel MP. The key switch 41 has a typical configuration of being rotated to reach an ON position and supply power to an electrical system, and reach a start position with further rotation thereof.

Figure 7:
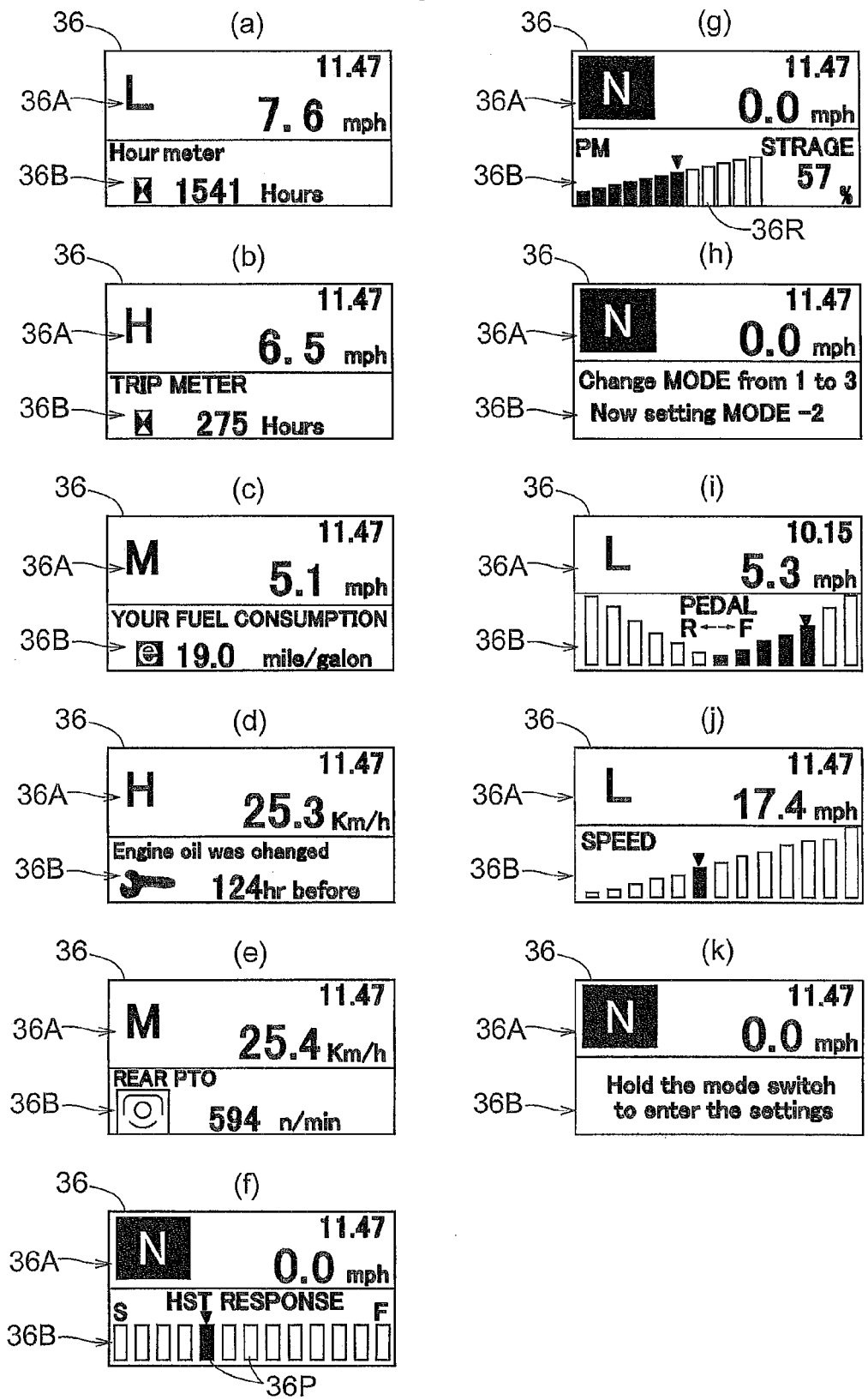

As shown in FIG. 7 the display 36 has a basic information display region 36A formed at an upper part, and a set information display region 36B formed at a lower part. Speed change information indicative of the setting position of the main speed change lever 27 and the travel speed of the travel vehicle body A are displayed in the basic information display region 36A, and set information is displayed in the set information display region 36B. The set information includes a unit of information displayed on the display 36 or alternatively, a parameter of the speed change control or the like. When the aforesaid display switching switch 40 is briefly pressed (for example, pressed only for a period of time less than five seconds), the display (the display of a plurality of screens shown in FIG. 7) is performed in a transition display mode such that set screens corresponding to a plurality of set information items are displayed in sequence on the set information display region 36B of the display 36 at each brief press. When the display switching switch 40 is pressed for a long time (for example, a period of time of at least five seconds) in the transition display mode, then a move is made to an information change mode, allowing changing of the set information. A description of the control mode for changing the set information will be made later.

(Information Displaying Device)

FIG. 4 shows the main points of a configuration of the information displaying device 50 for displaying information on the display 36. The information displaying device 50 has a control system having a microprocessor or the like. The control system includes storage means 51 comprising electrically erasable programmable read-only memory (EEPROM) or other non-volatile memory. The control system further includes a timer 52 also functioning as a calendar; operation information discriminating means 53; setting screen displaying means 54; setting information changing means 55; and setting screen generating means 56. A setting information processing unit P is constituted by the setting screen display means 54 and the setting information changing means 55. The information displaying device 50 acquires information of the display switching switch 40, outputs display information to the display 36, acquires information via an information acquisition system S, and outputs a control signal to a diesel particulate filter (DPF) control unit 57, a speed change control unit 58 and the cruise control unit 59.

Incidentally, the operation information discriminating means 53, the setting screen displaying means 54, the setting information changing means 55 and the setting screen generating means 56 as described above are assumed to be constituted of software. However, these may be constituted of hardware alone or may be constituted of a combination of hardware and software.

The storage means 51 stores a plurality of information items, including: trip value information; fuel consumption unit information; information on the oil change data when the engine oil was changed; PTO display subject information for setting which to be displayed between the rear PTO shaft 11 and the mid PTO shaft 12; speed change response information for determining the amount of control of the stepless speed change device 8 relative to the amount of depression on the speed change pedal 24; DPF setting information about a particulate matter (PM) removal device diesel particulate filter (DPF, not shown) for removing particulate matter contained in the exhaust gas of the engine 4; speed change mode information for setting the speed change state of the stepless speed change device 8; speed change pedal display information for determining whether or not to display the operated amount of the speed change pedal 24; cruise setting information during the cruise control; and setting information.

The operation information discriminating means 53 decides the press-operation time length when the display switching switch 40 is press-operated. Specifically, a decision is made as to whether a press is brief (e.g., less than five seconds; an example of a first operation information item) or a press is long (e.g., at least five seconds; an example of a second operation information item), and then sent to the setting information processing unit P. Description of the display processing in the setting screen displaying means 54 and in the setting information changing means 55 will be made later.

The setting screen generating means 56 generates a setting screen (a screen image) to be displayed on the display 36 by the setting screen displaying means 54. In the setting screen generating means 56, an hour meter, a trip meter, a fuel consumption meter, an oil meter, a PTO meter, a speed change response setting screen, a DPF setting screen, a speed change mode setting screen, a speed change pedal setting screen, a cruise setting screen, and a setting screen are displayed as the set screens (see also each of the screen examples in FIG. 7(*a*) through FIG. 7(*k*), which will be described later).

The information acquisition system S is a general term for sensors for acquiring information and sending the same to the information displaying device 50. The drawings do not illustrate a specific configuration thereof, but the information acquisition system S acquires information of: a speed sensor for acquiring the travel speed of the travel vehicle body A; a travel distance sensor for acquiring the travel distance of the travel vehicle body A; a speed change position sensor for acquiring the setting position(s) of the main speed change lever 27 and other elements; a PTO rotation sensor for separately acquiring the rotational speeds of the rear PTO shaft 11 and the mid PTO shaft 12; a remaining fuel amount sensor for measuring the remaining amount of fuel in a fuel tank (not shown); a speed change pedal sensor for measuring the depressed amount of the speed change pedal 24; and a speed change amount sensor for measuring the operated amount the speed change shaft of the stepless speed change device 8.

The DPF control unit 57 acquires the amount of particulate matter remaining in the PM removal device (not shown) and sends the same to the information displaying device 50, and a control signal from the information displaying device 50 causes cleaning to be performed.

The speed change control unit 58 rotates the speed change shaft of the stepless speed change device 8 based on the speed change response information when the speed change pedal 24 is depressed, and sets a swash plate angle of the stepless speed change device 8 based on the information set in the speed change mode information. A speed change motor (not shown) for rotating the speed change shaft is provided in order to execute such control, and control is performed by a feedback signal from the aforesaid speed change amount sensor.

The cruise control unit 59 sets a speed change target by the stepless speed change device 8 to a set cruise value stored in the storage means 51 when control in the cruise mode is executed by the cruise switch CS. In the cruise control, the speed change motor is moved while the signal of the speed change amount sensor is fed back thereto, to thereby obtain a target cruise speed. As described above, the cruise switch CS can be operated during travel with cruise control and the cruise speed can thereby be adjusted, but the set cruise value stored in the storage means 51 is not changed.

(Control Mode)

Figure 6:
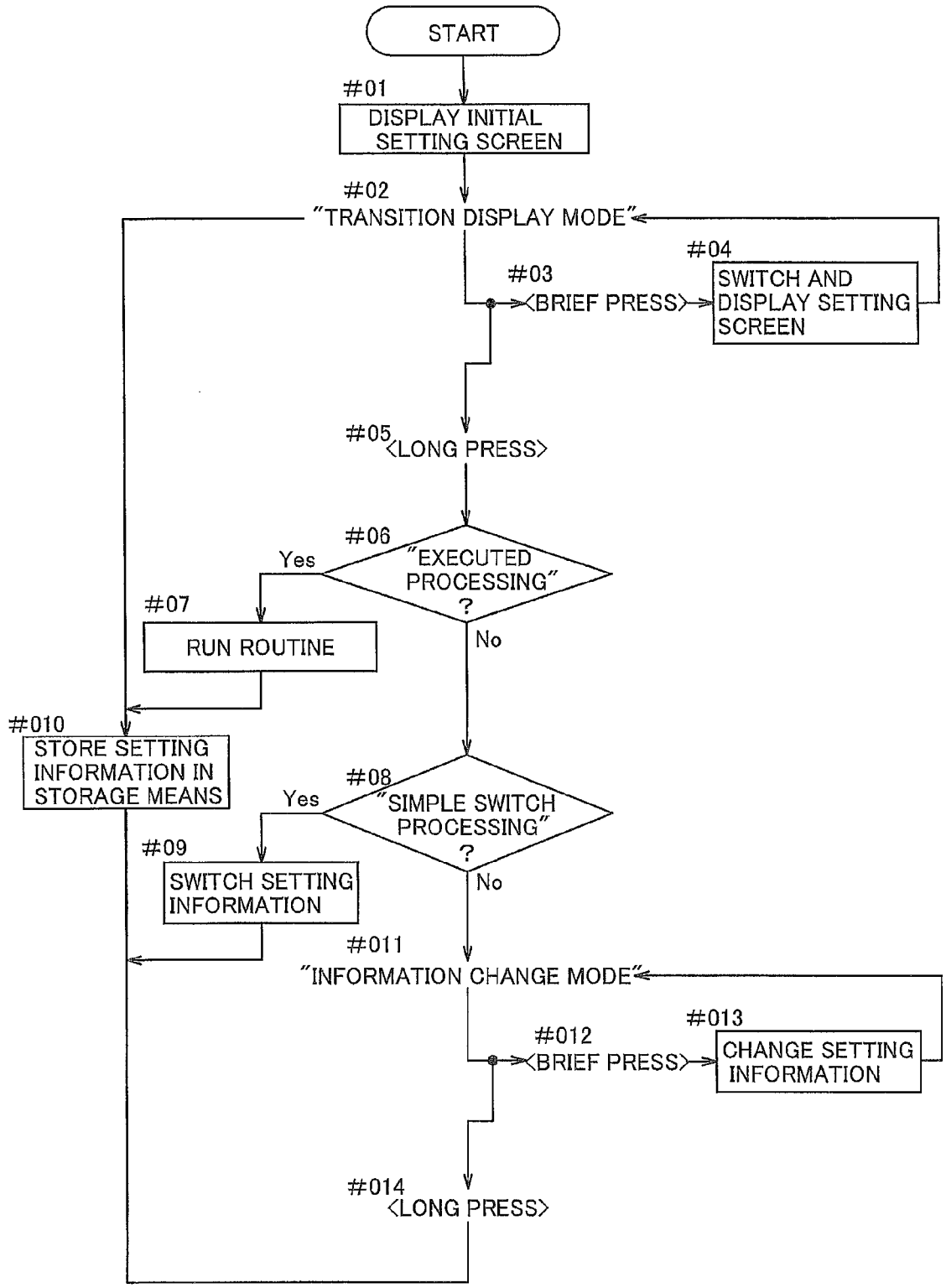

FIG. 6 is a flowchart illustrating the main points of the control mode of the information device 50, and FIG. 7 shows the screens displayed in sequence on the display 36 in the transition mode during the control.

In other words, when the key switch 41 to the ON position and power is supplied to the electrical system of the travel vehicle body A to initiate the information displaying device 50, an initial setting screen shown in FIG. 7(*a*) is displayed on the display 36 (step #01), and control in the transition display mode is executed (step #02). When the display switching switch 40 is briefly pressed in the transition display mode (step #03), the displayed setting screen is switched each time a brief press is performed (step #04), whereby the set screens illustrated in FIGS. 7(*a*) through 7(*k*) are displayed in the illustrated sequence.

When the display switching switch 40 is pressed for a long time while a setting screen is displayed in the transition display mode (step #05), if the setting screen displayed on the display 36 is for confirming "executed processing", the control goes to a run routine and thereafter the transition display mode is restored (steps #06, #07). If the setting screen is for performing "simple switch processing", the set information is switched over accordingly and thereafter this set information is stored in the storage means 51 (steps #08 to #010). If no executed processing is performed and there is no simple switch processing, the control goes to the information change mode (step #011). When the display switching switch 40 is briefly pressed in the information change mode (step #12), the set information corresponding to the setting screen displayed on the display 36 is changed (step #013). When the display switching switch 40 is pressed for a long time in the information change mode (step #014), on the other hand, the set information is stored in the storage means 51 (step #010), and the transition display mode is restored.

The set information and the like displayed on the display 36, during the processing as described above with reference to the flowchart, will be described next in more specific.

In the transition display mode, the setting screen displaying means 54 generates the set screens as illustrated in FIG. 7(*a*) through FIG. 7(*k*) and displays the same on the display 36 each time the display switching switch 40 is pressed briefly. To display the set screens in the stated sequence, the setting screen generating means 56 assigns a serial number or the like to the set screens as illustrated in FIG. 7(*a*) through FIG. 7(*k*); incrementally counts a display count value each time the display switching switch 40 is pressed briefly; and performs a process for identifying a setting screen of a serial number corresponding to the display count value and displaying the same on the display 36, along with other processing.

FIG. 7(*a*) shows the hour meter, acting as the initial setting screen, being displayed on the set information display region 36B. The hour meter displays an integrated value of the work time of the control system, and the numeric value of the hour meter is set so as not to be cleared even when the display switching switch 40 is pressed for a long time. Alternatively, the integrated value of the hour meter may be configured to be cleared by a long press of the display switching switch 40.

FIG. 7(*b*) shows the trip meter, acting as a setting screen, being displayed on the set information display region 36B. Pressing the display switching switch 40 for a long time while the trip meter is displayed clears the numeric value of the trip meter (the integrated time), and also clears a trip value in the storage means 51. FIG. 7(*c*) shows the fuel consumption meter, acting as a setting screen, being displayed on the set information display region 36B. Pressing the display switching switch 40 for a long time while the fuel consumption meter is displayed sets the unit of the fuel consumption meter to either one of "miles/gallon" or "hours/gallon," and switches over the fuel consumption unit in the storage means 51 accordingly. FIG. 7(*d*) shows the oil meter being displayed on the set information display region 36B. Pressing the display switching switch 40 for a long time while the oil meter is displayed clears the numeric value of the oil meter (the integrated time), and also clears the trip value in the storage means 51.

As described above, the set information corresponding to the set screens in FIG. 7(*b*), FIG. 7(*c*) and FIG. 7(*d*) is information pertaining to a binary selection, such as one whether or not the information to be cleared, and therefore pressing the display switching switch 40 for a long time directly switches over the set information, which is then stored in the storage means 51. The mode then moves to the transition display mode, and thus the transition display mode is apparently maintained. Such processing corresponds to the processing during the aforesaid steps #08 through to #010 in FIG. 6.

FIG. 7(*e*) shows the PTO meter, acting as a setting screen, being displayed on the set information display region 36B, where the PTO meter displays the rotational speed of selected one of the rear PTO shaft 11 and the mid PTO shaft 12.

Figure 8:
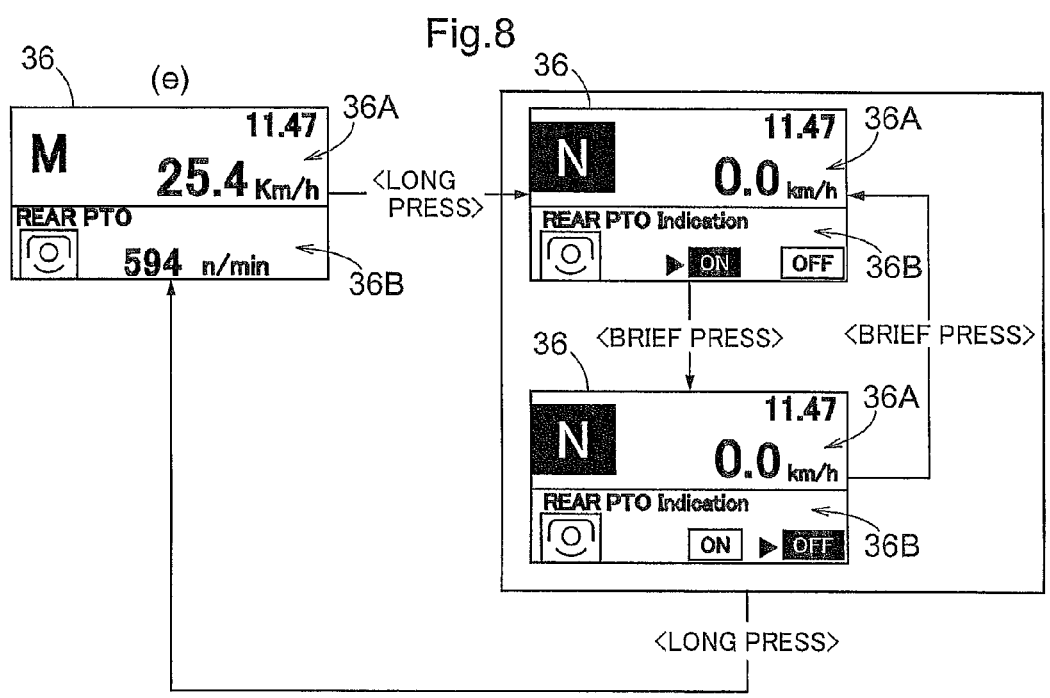

As shown in FIG. 8, pressing the display switching switch 40 for a long time while the PTO meter is displayed moves the control to the information change mode. In the information change mode, briefly pressing the display switching switch 40 displays, in solid black, one of an ON button for selecting the rear PTO shaft 11 to be displayed on the PTO meter and an OFF button for not selecting the rear PTO shaft 11 to be displayed (thus selecting the mid PTO shaft 12), whereby it is possible to visually confirm the selected state. Pressing the display switching switch 40 for a long time after the selection confirms the selected state, updates the PTO information to be displayed in the storage means 51, and returns to the previous transition display mode.

FIG. 7(*f*) shows the speed change response setting screen, acting as a setting screen, being displayed on the set information display region 36B, where the speed change response setting screen displays the setting state of a reaction speed of the stepless speed change device 8 when the speed change pedal 24 is depressed. The response setting screen displays a solid white bar graph of a plurality of setting indices 36P illustrating a gradation of response speeds, and displays one setting index 36P in solid black for indicating the current setting position from among the plurality of setting indices 36P.

Figure 9:
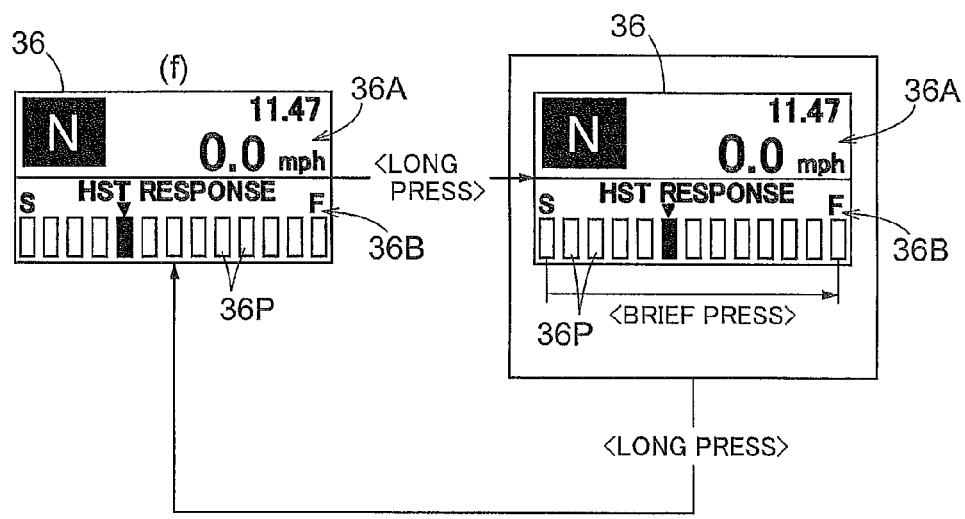

As shown in FIG. 9, pressing the display switching switch 40 for a long time while the speed change response setting screen is displayed moves the control to the information change mode. Briefly pressing the display switching switch 40 in the information change mode sequentially moves, in one direction (which in the drawing is rightward), the setting index 36P displayed in solid black within the plurality of setting indices 36P, it being thus possible to visually confirm the selected state. When the display switching switch 40 is briefly pressed when the setting index 36P displayed in solid black arrives at one end, then setting index 36P at the other end of the plurality of setting indices 36P is subsequently displayed in solid black, following which the setting index 36P being displayed in solid black moves sequentially in one direction, similarly with respect to the prior description, each time the display switching switch 40 is briefly pressed.

In particular, as a process for causing the setting index 36P displayed in solid black to move within the plurality of setting indices 36P, continuously incrementing or decrementing (i.e. concatenating) numeric values are assigned to the plurality of setting indices 36P such that a count value will be incremented or decremented each time the display switching switch 40 is briefly pressed, to thereby add/subtract to/from the count value and then display in solid black at the position corresponding to the count value. When the count value reaches a value greater than the number of the setting indices 36P during the processing, an initial value is assigned to the count value, whereby solid black is displayed at one end of the plurality of setting indices 36P, it being then possible to use a brief press of the display switching switch 40 to move. Pressing the display switching switch 40 for a long time when the setting is completed confirms the selected state, and accordingly updates the speed change response information in the storage means 51, and the processing restores the original transition display mode.

Pressing the display switching switch 40 for a long time when the set screen in FIG. 7(*e*) or FIG. 7(*f*) is displayed moves the control to the information change mode. In the information change mode, briefly pressing the display switching switch 40 executes processing for changing the set information. Such processing allows for fine-tuned setting changes. The processing as described above corresponds to the aforesaid steps #011 through #014 and #010 in FIG. 6.

FIG. 7(*g*) shows DPF setting screen, acting as a setting screen, being displayed on the set information display region 36B, where the DPF setting screen displays the amount of particulate matter remaining in the PM removal device (not shown). The DPF setting screen displays a solid white bar graph of a remaining amount index 36R indicative of the amount of particular matter, and displays, in solid black, a remaining amount index indicative of the current remaining amount from among the plurality of remaining amount indices 36R, and a percentage indicative of the remaining amount is displayed by a numeric value. An operator judges whether or not there is need to clean the particular matter remaining in the PM removal device, based on the display of the DPF setting screen.

Figure 10:
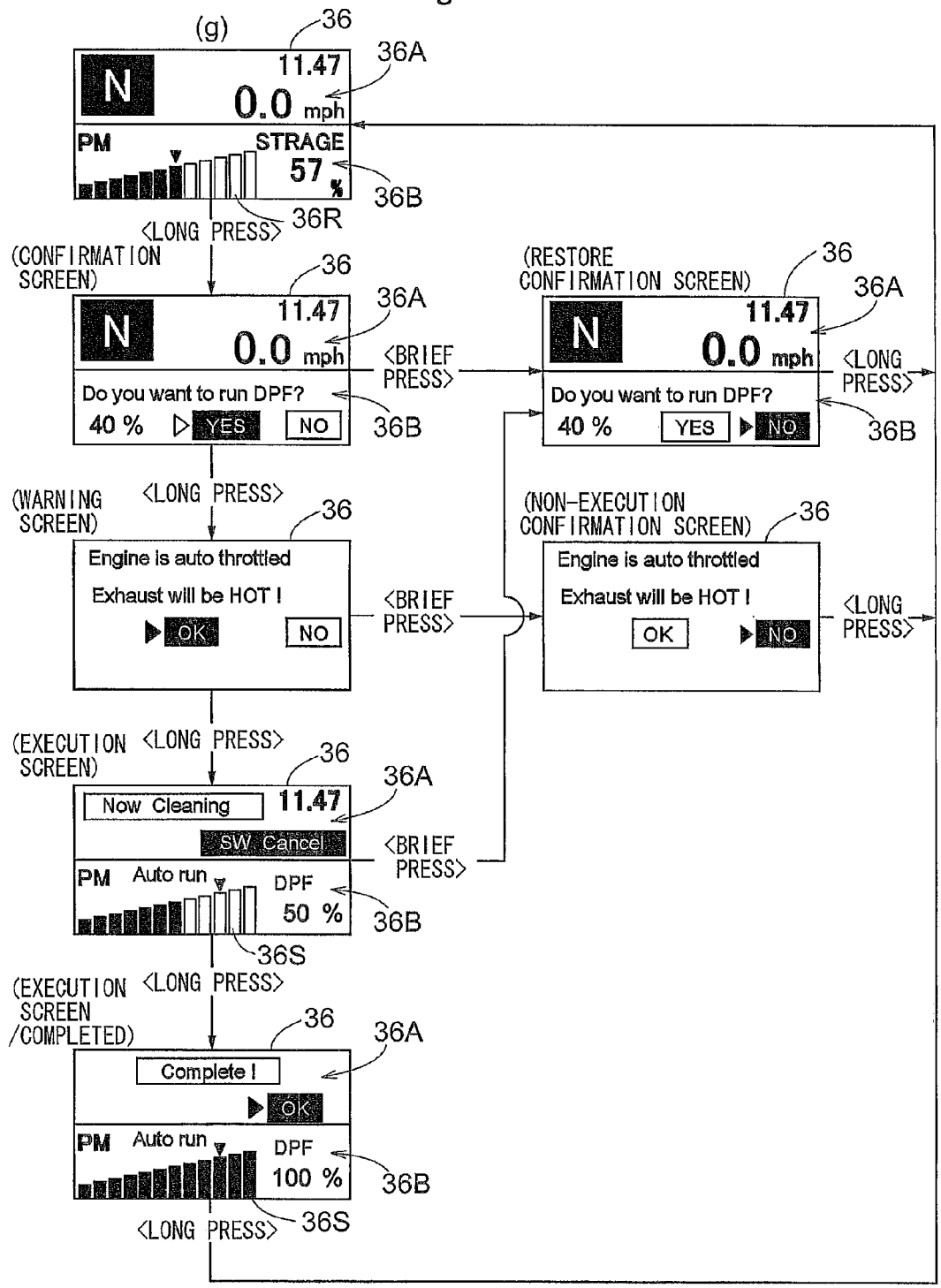

As shown in FIG. 10, pressing the display switching switch 40 for a long time while the DPF setting screen is displayed moves the control to the information change mode, and also causes the display 36 to display a confirmation screen. In the confirmation screen, a "Yes" button for executing the cleaning is selected (displayed in solid black) in the initial state. Briefly pressing the display switching switch 40 in this display state switches over the screen to a restoration confirmation screen in which the "No" button for not executing the cleaning is selected (displayed in solid black). And, pressing the display switching switch 40 for a long time while the "No" button is selected in the restoration confirmation screen restores the original transition display mode, without performing any removal of the particulate matter remaining in the PM removal device.

Pressing the display switching switch 40 for a long time while the "Yes" button is selected in the confirmation screen causes a warning screen to be displayed for warning that the exhaust gas temperature is elevated. In the warning screen, the "OK" button is selected (displayed in solid black) in the initial state. Briefly pressing the display switching switch 40 in this display switches to a non-execution confirmation screen in which the "No" button for not executing the cleaning is selected (switches to a solid black display thereof). Pressing the display switching switch 40 for a long time while the "No" button is selected (displayed in solid black) in the non-execution confirmation screen restores the original transition display mode, without performing any removal of the particulate matter remaining in the PM removal device.

Pressing the display switching switch 40 for a long time while the OK button is selected (displayed in solid black) in the warning screen causes the execution screen to be displayed and starts the cleaning. In the execution screen, a bar graph, displayed in solid white in the initial state, of a plurality of processing indices 36S indicative of the execution situation of the cleaning is displayed and, as the cleaning progresses, the plurality of processing indices 36S is switched sequentially to be displayed in solid black (the solid black display increases), and a numeric value indicative of the percentage of processing also increases. Whereby, the particulate matter remaining in the PM removal device is removed, and an execution screen/completion is displayed when the removal is completed. Pressing the display switching switch 40 for a long time after the cleaning is thus completed restores the original setting screen.

In contrast, when the cleaning is executed (when the execution screen is being displayed), briefly pressing the display switching switch 40 interrupts the execution of the cleaning midway, and the aforesaid restoration confirmation screen is displayed. In the restoration confirmation screen, the "No" button is in a selected state (displayed in solid black), and pressing the display switching switch 40 for a long time restores the original transition display mode, while the removal of the particulate matter remaining in the PM removal device remains interrupted. Such processing corresponds to steps #06 and #07 in FIG. 6.

Figure 11:
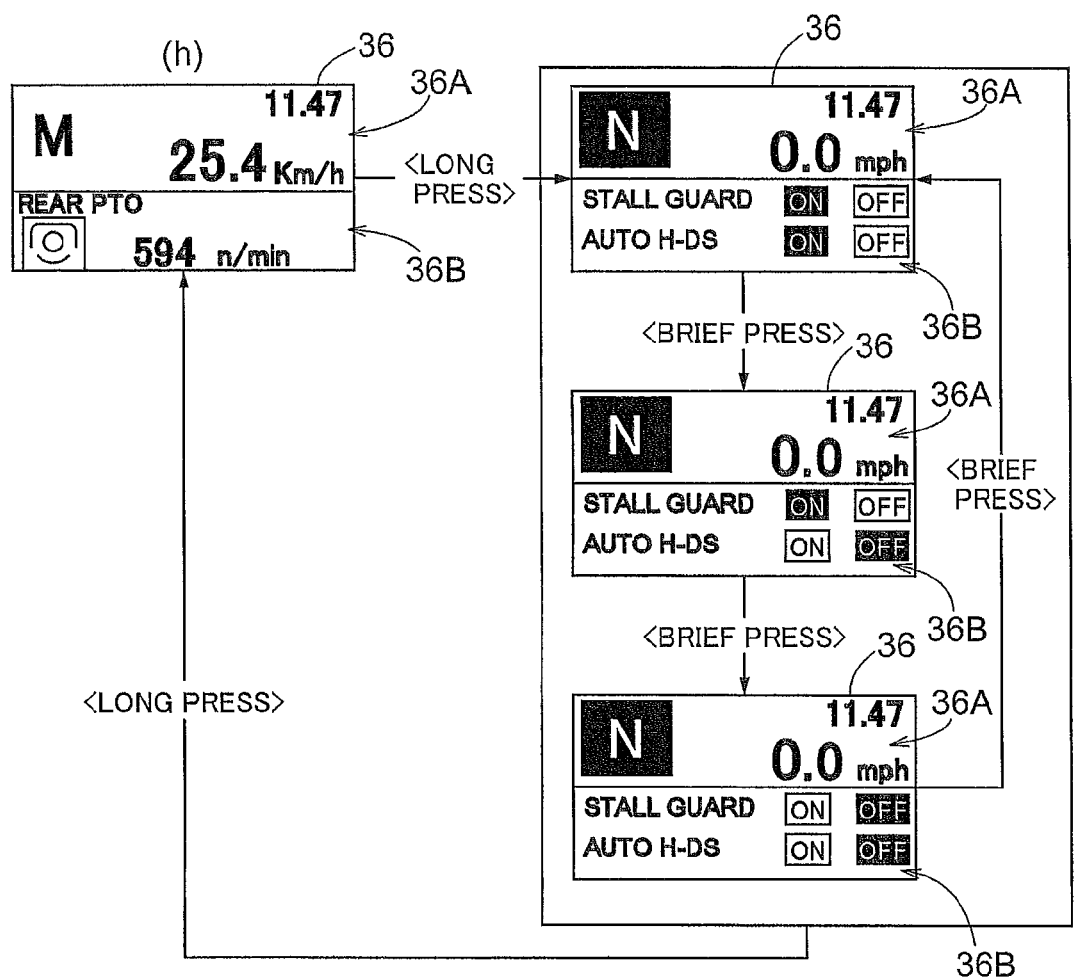

FIG. 7(h) shows the speed change mode setting screen, acting as a setting screen, being displayed on the set information display region 36B. As shown in FIG. 11, pressing the display switching switch 40 for a long time while the speed change mode setting screen is displayed moves the control to the information change mode, and causes the display 36 to display the mode setting screen. The mode setting screen displays an ON button and an OFF button of a stall guard, and also displays an ON button and an OFF button of an automatic control. In the mode setting screen, one of the ON button or the OFF button of the stall guard is selected (displayed in solid black) and one of the ON button or the OFF button of the automatic control is selected (displayed in solid black). Briefly pressing the display switching switch 40 while the mode setting screen is displayed, one of the three modes as shown in FIG. 11 is selected with a combination of the respective ON buttons and the respective OFF buttons. Pressing the display switching switch 40 for a long time after such a selection confirms the selected state (the set state), updates the speed change mode in the storage means 51 accordingly, and restores the original transition display mode. Such processing corresponds to the aforesaid steps #011 through #014 and #010 in FIG. 6.

FIG. 7(i) shows the speed change pedal operation screen, acting as a setting screen, being displayed on the set information display region 36B, where the speed change pedal operation screen displays a graph of the depression operation amount of the speed change pedal 24 such that the depression operation amount can be visually confirmed. Pressing the display switching switch 40 for a long time while the speed change pedal operation screen is displayed allows for a setting to select whether the operation amount of the speed change pedal is to be displayed or not; and accordingly updates the speed change pedal display information in the storage means 51. In other words, even when the speed change pedal operation screen is displayed in the transition display mode, a setting is made so as not to display the depressed amount of the speed change pedal 24. Such processing corresponds to the aforesaid steps #08 to #010 in FIG. 6.

FIG. 7(j) shows the cruise setting screen being displayed on the set information display region 36B, where the cruise setting screen displays a solid white bar graph of a plurality of setting indices illustrating a gradation of setting values, and displays, in solid black, one of the plurality of setting indices indicative of the current setting position. In other words, a speed change value (travel speed) of the stepless speed change device 8, when the cruise control is executed by an operation of the cruise switch CS, is displayed. In particular, when the cruise control is first executed, the cruise control unit 59 executes travel at a speed which is displayed in solid black on the cruise setting screen even when the speed change pedal 24 is not being depressed, and as described above, a light (shallow) operation of one end side of the operational tool 45 marked "UP" causes, with each operation, the cruise speed to be elevated by a set value, and causes the solid black display position of the setting index to move toward the acceleration side by one grade. Conversely, a light (shallow) operation of the other end side of the operational tool 45 marked "DOWN" causes, with each operation, the cruise speed to be lowered by a set value, and causes the solid black display position of the setting index to move toward the deceleration side by one grade.

Pressing the display switching switch 40 while the cruise setting screen is displayed moves the control to the information change mode. In the information change mode, briefly pressing the display switching switch 40 sequentially moves, in one direction, the setting position displayed in solid black within a plurality of setting positions, similarly to the aforesaid control of the speed change response setting screen (see FIG. 9), it being thus possible to visually confirm the set state. And, briefly pressing the display switching switch 40, when the setting position displayed in solid black arrives at one end in the one direction, the solid black setting position is subsequently displayed at the other end. Thereafter, the solid black setting position moves sequentially in the one direction each time the display switching switch 40 is briefly pressed, similarly to the previous description.

In particular, as processing for causing the setting position displayed in solid black to move within the plurality of setting indices, continuously incrementing or decrementing (i.e. concatenating) numeric values are assigned to the plurality of setting indices such that a count value will be incremented or decremented each time the display switching switch 40 is briefly pressed, to thereby add/subtract to/from the count value and display a solid black setting position at a position corresponding to the count value. When the count value reaches a value greater than the number of the setting indices during the processing, an initial value is assigned to the count value, whereby a solid black setting position is displayed at one end part of the plurality of setting indices, it being then possible to use a brief press of the display switching switch 40 to move. Pressing the display switching switch 40 for a long time when the setting operation is completed confirms the selected setting state, and accordingly updates the set cruise value in the storage means 51, and restores the original transition display mode. Such processing corresponds to the aforesaid steps #011 through #014 and #010 in FIG. 6.

FIG. 7(k) shows the setting screen, acting as a setting screen, being displayed on the set information display region 36B, where pressing the display switching switch 40 for a long time while the setting screen is displayed moves the control to the information change mode. In the information change mode, it is possible to select set screens (not shown) corresponding to a plurality of setting targets. Briefly pressing the display switching switch 40 while a setting screen is selected changes the set information. Pressing the display switching switch 40 for a long time confirms the set information, which is then stored in the storage means 51 as setting information.

Although not illustrated by the flowchart in FIG. 6, if the display switching switch 40 is not pressed briefly or for a long time over a set period of time after the control moves to the information change mode after displaying one of the PTO meter, the speed change response setting screen, the DPF setting screen, the speed change mode setting screen and the cruise setting screen (that is, if a non-operation state lasts longer than a set period of time), then the transition display mode is restored without storing any set information into the storage means 51. In such processing, if the power source is cut off before the display switching switch 40 is pressed for a long time, then the set information is not stored into the storage means 51 even after the mode has moved to the information change mode and the set information has been changed, and in this case, the set information retains the value prior to the move to the information change mode.

(Functions and Effects of the First Embodiment)

As describe above, the set screen displayed on the display 36 is initially displayed in the transition display mode, and the subsequent briefly pressing the display switching switch 40 switches the setting screen in a set sequence.

When the display switching switch 40 is pressed for a long time with any one of the fuel consumption meter, the oil meter or the speed change pedal setting screen being displayed from among the plurality of set screens, the setting information changing means 55 performs switching (including clearing) of the set information corresponding to the setting screen, and the switched set information is stored in the storage means 51. During such processing, since the set information comprises binary selection information such as an ON/OFF state and clearance allowance/prohibition (e.g. information indicated in one bit), the set information is changed while retaining the transition display mode, without moving to the information change mode, which is accordingly stored into storage means 51.

On the other hand, when the display switching switch 40 is pressed for a long time with any one of the PTO meter, the speed change response setting screen, the speed change mode setting screen and the cruise setting screen is being displayed from among the plurality of set screens, the processing moves to the information change mode. Then, the setting information changing means 55 performs changing of the setting information corresponding to the setting screen each time the display switching switch 40 is briefly pressed. Thereafter, the changed set information is stored into the setting information changing means 55 by pressing the display switching switch 40 for a long time, and the transition display mode is restored.

During the display of one of the PTO meter, the speed change response setting screen, the speed change mode setting screen and the cruise setting screen is to be displayed, since the set information is indicative of one of three or more states (e.g. information indicated in a plurality of bits), pressing the display switching switch 40 for a long time moves the control to the information change mode; and briefly pressing the display switching switch 40 in the information change mode changes the set information. Further, pressing the display switching switch 40 for a long time after such change stores the set information into the storage means 51 and restores the transition display mode.

Incidentally, when the display switching switch 40 is pressed for a long time while the DPF setting screen is being displayed, the control moves to the information change mode, but pressing the display switching switch 40 for a long time in this information change mode merely executes the cleaning, and the set information is not changed.

As described above, in the present invention, not only changing in the operation time of the single display switching switch 40 allows selection between the transition display mode and the information change mode without the need to provide two switches, but also, when the set information is changed in the information change mode too, the set information can be stored in the storage means 51 and the transition display mode can be restored by the display switching switch 40, thus changing the set information with a simple configuration in a simple operational state.

[Modifications of the First Embodiment]

As described above, the present invention has its utility to a set information displaying device for selecting and displaying one of a plurality of set screens on a display of a work vehicle, and for changing the set information from the displayed setting screen.

However, this is not limitative and may also be configured as follows:

(a) A first switch for inputting a first operation information item and a second switch for inputting a second operation information item are provided. The first switch and the second switch may be of the push-button type; the operation information discriminating means 53 determines that the first operation information item has been inputted when the first switch has been operated, and determines that the second operation information item has been inputted when the second switch has been operated. In this manner, providing the two switches makes it possible to input the first operation information item and the second operation information item with a simple operation.

(b) A first switch for inputting a first operation information item, the first switch being operated by a single operational tool, and a second switch for inputting a second operation information item are provided. The operational tool may be a lever type tool which maintains a neutral posture in a non-operational state, or may be a tool which is swung in a seesaw manner. Specifically, as with the cruise switch CS, a single operational tool 45 includes a first switch 46 and a second switch 47. In such a configuration, when the operational tool 45 is in the neutral posture, the first switch 46 and the second switch 47 are maintained in the non-operational state (the OFF state), and operating one end part of the operational tool 45 turns the first switch 46ON and inputs the first operation information item, while operating the other end part turns the second switch 47ON and inputs the second operation information item.

In this manner, the first switch 46 and the second switch 47 can be operated by the single operational tool 45, the operation being easier than a configuration for operating two switches that are positioned apart, and two types of operation information items can be inputted.

(c) In operation of the setting information changing means 55, any desired display aspect for the information on the display 36 in the information change mode can be set. For example, when determination is made that the second operation information item has been inputted, a screen for setting is displayed anew on the display 36 (the window is opened anew), it being then possible to change the set information in the screen for setting.

[Second Embodiment]

A second embodiment of a work vehicle will be described next, with reference to FIGS. 12 to 18. In this embodiment as well, description will be made with reference to a tractor as an example of the work vehicle.

(Overall Configuration)

Figure 12:
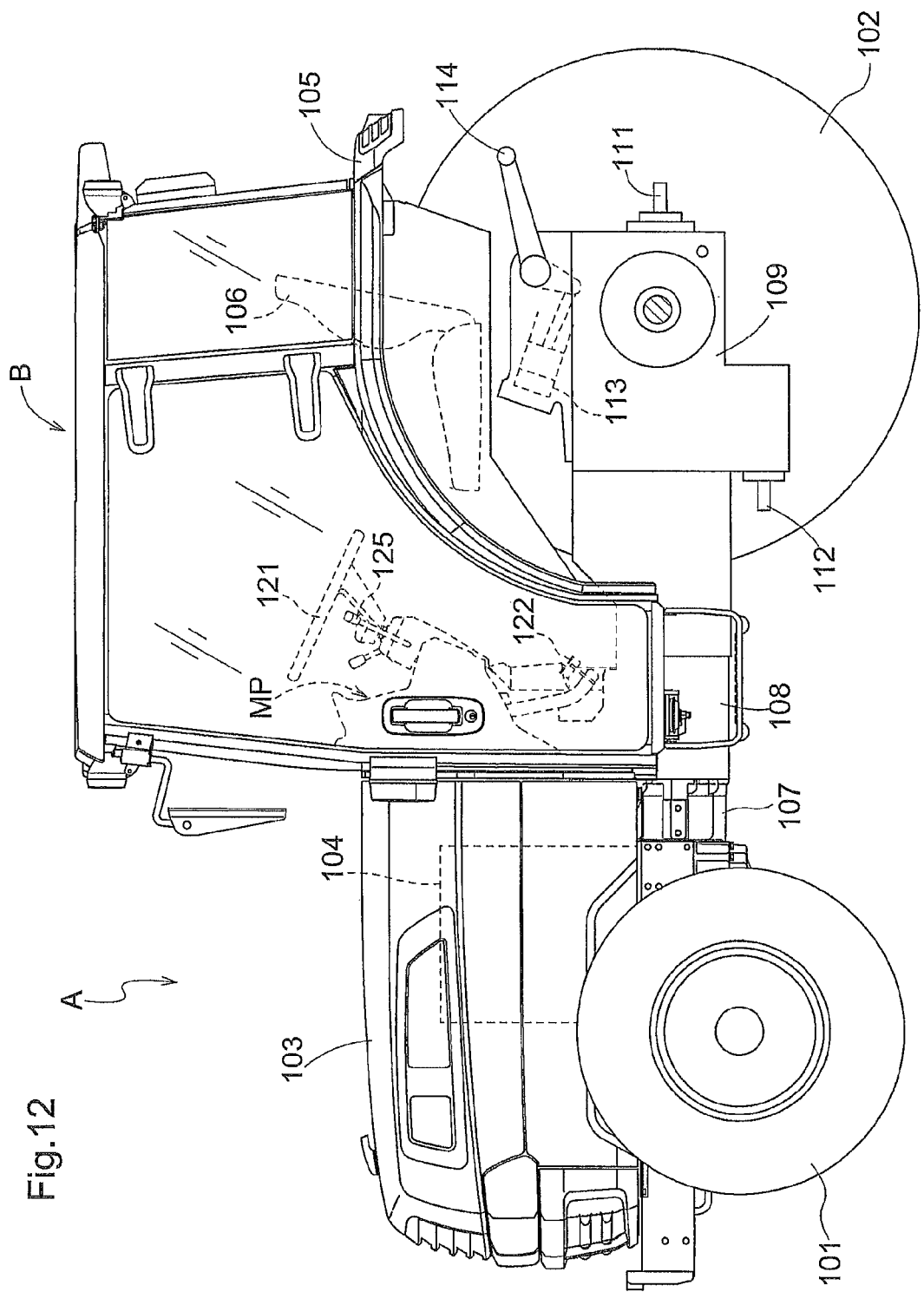

As shown in FIG. 12, the tractor is configured to comprise a pair of right/left front vehicle wheels 101 and a pair of right/left rear vehicle wheels 102, each acting as a travel device for a travel vehicle body A; a diesel engine 104 housed within an engine hood 103 of a front part of the travel vehicle body A; an operation seat 106 arranged at a middle position between right and left rear wheel fenders 105 for constituting an operation unit; and a cabin B for surrounding the operation unit.

In the tractor, a clutch housing 107, a hydrostatic stepless speed change device (HST) 108 and a transmission case 109 are connected one after another in the stated sequence toward a rear side of the engine 104. The transmission case 109 is arranged under the operation seat 106. These components form a transmission system for transmitting drive force from the transmission case 109 to the right/left front vehicle wheels 101 and the right/left rear vehicle wheels 102, to thereby form a four-wheel-driven type tractor.

A rear PTO shaft 111 is provided at a rear end of the transmission case 109. A mid PTO shaft 112 is provided on a bottom of the transmission case 109. A hydraulic lift cylinder 113 is provided at an upper position of the transmission case 109. A pair of right/left lift arms 114 are provided at a rear end of the transmission case 109 to be vertically pivotal by the lift cylinder 113. Though not depicted in the drawings, the tractor is configured such that a rotary tiller device, a plow or other ground working implement may be connected to the rear end of the travel vehicle body A via a three-point link mechanism, whereby the ground working implement can be vertically moved by the lift cylinder 113.

When a rotary tiller device is connected, tilling work is performed by driving rotary claws of the rotary tiller device which claws are driven under the drive force from the rear PTO shaft 111. When a lawn-mowing device or other mid-mount ground working implement is connected to a middle position between the front vehicle wheels 101 and the rear vehicle wheels 102, the ground work by the ground working implement is performed under the drive force from the mid PTO shaft 112.

(Operation Unit)

Figure 13:
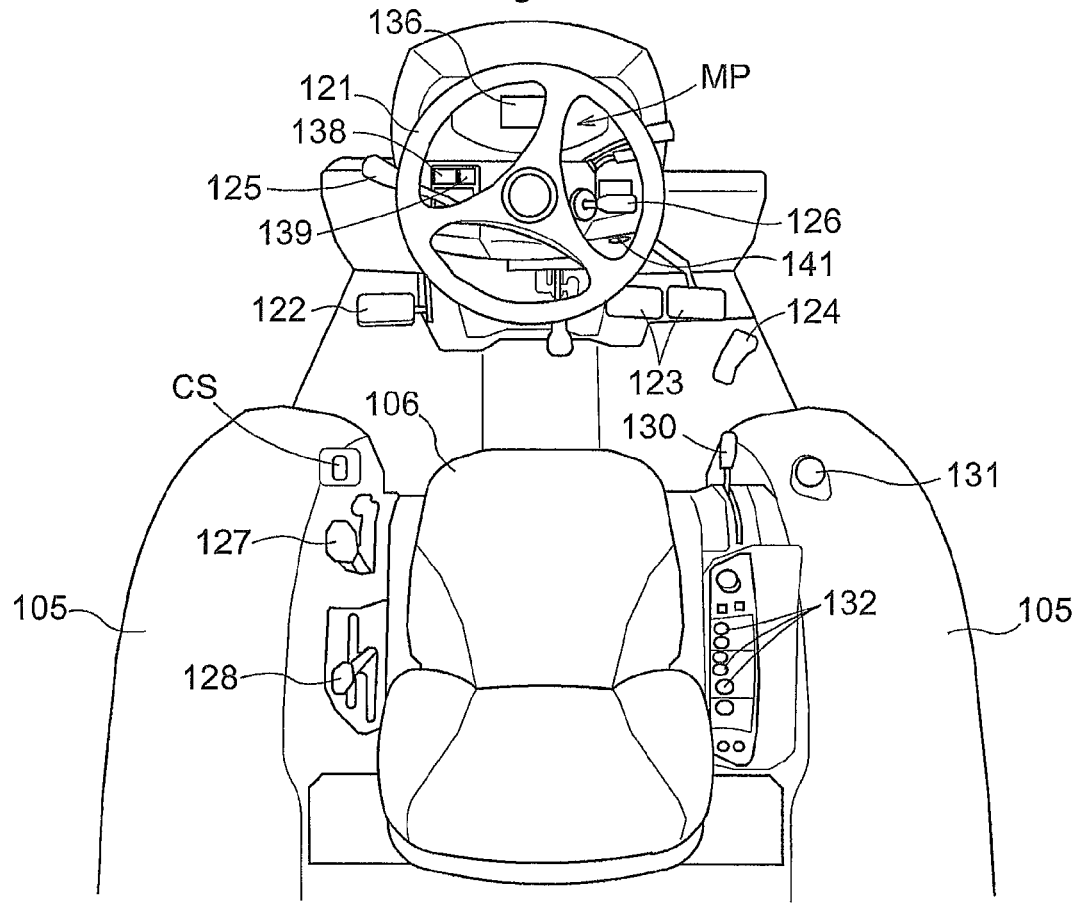

The cabin B has a typical structure including: a roof on an upper part thereof; a front glass on a front part thereof; doors formed of transparent glass or transparent resin on the right/left sides thereof to be openable and closable; and a rear glass on a rear part thereof. As shown in FIG. 13, a steering wheel 121 is arranged at a front position of the operation seat 106 within the cabin B for performing a steering operation. A clutch pedal 122 is arranged on the left side of a lower position of the steering wheel 121. Two brake pedals 123 are arranged on the right side, as well as a speed change pedal 124. A forward/reverse switching lever 125 and a forcible lift lever 126 are provided in the vicinity of the steering wheel 121, the forward/reverse switching lever 125 performing selection between the forward travel and the reverse travel of the travel vehicle body A, and the forcible lift lever 126 performing selection of states of the ground working implement, which is connected to the rear end of the travel vehicle body A, between a lowered working level and a raised set level.

A main speed change lever 127, an auxiliary speed change lever 128, and a cruise switch CS are arranged on a left side of the operation seat 106. A position control lever 130 for setting a swing angle each of the lift arms 114 relative to the vehicle body; a PTO switch 131 for selecting the drive between the rear PTO shaft 111 and the mid PTO shaft 112; and a plurality of operation switches 132 are arranged on a right side of the operation seat 106.

Figure 16:
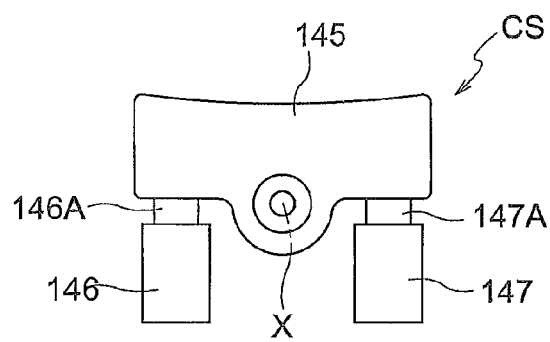

As shown in FIG. 16, the cruise switch CS is configured such that a single operational tool 145 can be used for a manual operation each of the first switch 146 and the second switch 147. The operational tool 145 is supported to be pivotable around an axis X. The operational tool 145 is supported to be swingable in a seesaw manner so as to maintain a neutral posture in non-operational state, to swing to one side when one end part (toward the first switch 146) is operated and to swing to the other side when another end part (toward the second switch 147) is operated. A first operation body 146A, which is urged so as to protrude, is provided to the first switch 146, and a second operation body 147A, which is urged so as to protrude, is provided to the second switch 147; the first operation body 146A and the second operation body 147A come into contact with a rear surface side of the operational tool 145, and the operational tool 145 is thereby maintained at the neutral posture. A spring for urging the operational tool 145 to a neutral position may also be provided.

The cruise switch CS is configured such that a light (shallow) operation of each of the end parts brings a first-stage switch part of either the first switch 146 or the second switch 147 into an ON state, and a strong (deep) operation brings a second-stage switch part into an ON state. Such a configuration makes it possible to operate the first-stage switch part and second-stage switch part of the first switch 146 to be on by adjusting the force of the press-operation on one end part of the operational tool 145, and possible to operate the first-stage switch part and second-stage switch part of the second switch 147 to be on by adjusting the force of the press-operation on the other end part of the operational tool 145.

Although the control configuration is not depicted in the drawings, the stepless speed change device 108 includes an actuator for rotating a speed change operation shaft of the stepless speed change device 108, and a speed change amount sensor for measuring the amount of the rotation of the speed change operation shaft. A cruise control device (e.g. a speed change ECU) is configured such that the actuator is controlled with a signal from the speed change amount sensor being fed back thereto. A signal from the first switch 146 and a signal from the second switch 147 are inputted to the cruise control device.

When the travel vehicle body A travels, a control mode is set such that a strong (deep) operation of one end part, marked "UP", of the operational tool 145 of the cruise switch CS as shown in FIG. 18 transits to a cruise control, and such that a strong (deep) operation of the other end part, marked "DOWN", of the operational tool 145 stops the cruise control. When the transition to the cruise control is first made, travel is performed at a pre-set cruise speed, and a control mode of a cruise control device is set such that, during the cruise control, a light (shallow) operation of the end side of the operational tool 145 marked "UP" boosts the cruise speed by a set value at each operation, and a light (shallow) operation of the end side of the operational tool 145 marked "DOWN" lowers the cruise speed by a set value at each operation.

Figure 14:
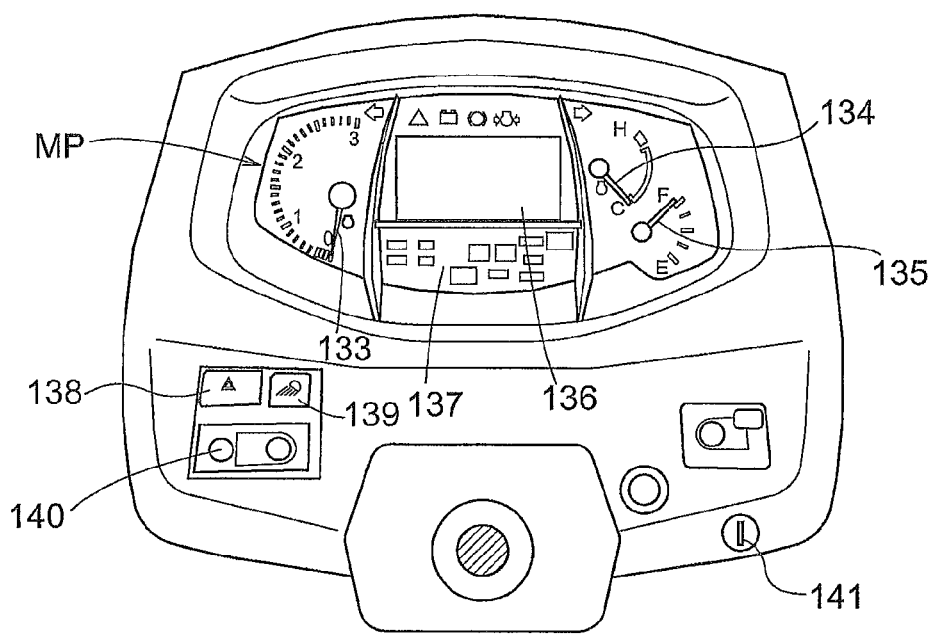

As shown in FIG. 14, a meter panel MP is arranged at a front position of the steering wheel 121; on the meter panel MP, an engine rotation rate meter 133 is arranged on the left side, a cooling water temperature meter 134 and a remaining fuel amount meter 135 are arranged on the right side, a liquid crystal display 136 for displaying information is arranged in the middle, and an information announcing unit 137 for announcing the situations of various different machines by lighting a lamp is formed below the display 136.

A hazard switch 138, a lamp switch 139 for lighting headlights and the like, and a push-switch style display switching switch 140 are arranged to the left side below the meter panel MP; and a key switch 141 is arranged to the right side below the meter panel MP. The key switch 141 has a typical configuration of being rotated to reach an ON position and supply power to an electrical system, and reach a start position with further rotation thereof.

The display 136 displays the travelling speed of the travel vehicle body A and the speed change stage of the main speed change lever 127. The display 136 is configured such that an operation of the display switching switch 140 switches over the screen to display such as the fuel consumption, the rotation rates of the rear/mid PTO shaft 111 or 112. In particular, this tractor has a theft prevention function authentication when the engine 104 is started up; and the cruise switch CS functions also as a device for inputting the authentication information.

(Authentication Control Device)

Figure 15:
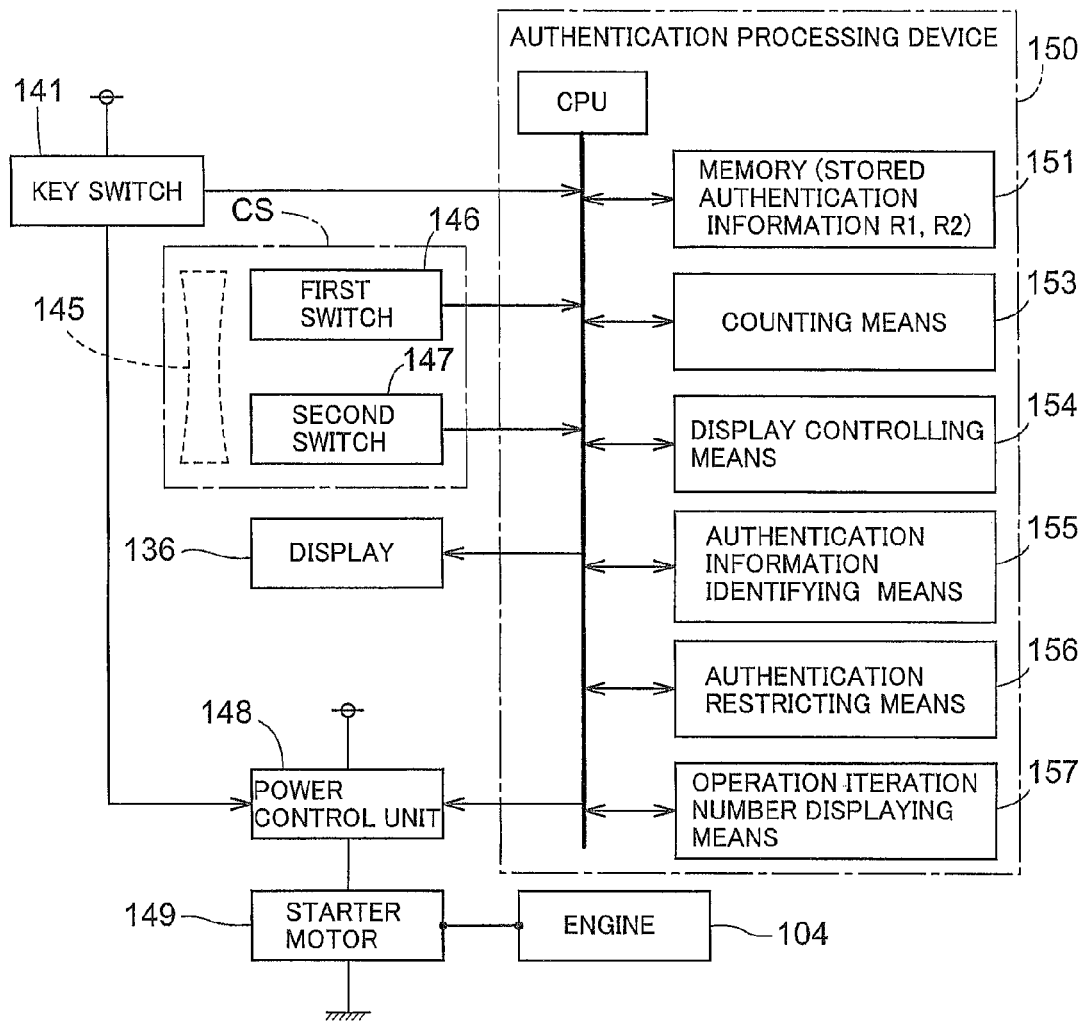

As shown in FIG. 15, an authentication processing device 150 acts as an authentication processing unit for receiving a signal inputted from each of the key switch 141, the first switch 146 and the second switch 147, and outputting a control signal to the display 136 and to a power control unit 148 acting as power controlling means. The authentication processing device 150 has a microprocessor or other processing system; and includes: an EEPROM or other non-volatile memory (an example of the storage means) 151; counting means 153; display controlling means 154; authentication information identifying means 155; authentication restricting means 156; and operation iteration number displaying means 157.

Incidentally, the display controlling means 154, the authentication information identifying means 155, the authentication restricting means 156 and the operation iteration number displaying means 157 are typically constituted of software, but these may be constituted of hardware alone or may be constituted of a combination of hardware and software.

The power control unit 148 is constituted of a relay, a power control element and the like which are incorporated in an electrical system for supplying power from a power source to a starter motor 149. The power control unit 148 is configured to be switched over between a power supplying state to the starter motor 149 when the key switch 141 is operated to a start position, and a power cutoff state of the starter motor 149, according to a control signal sent from the authentication processing device 150.

Figure 17:
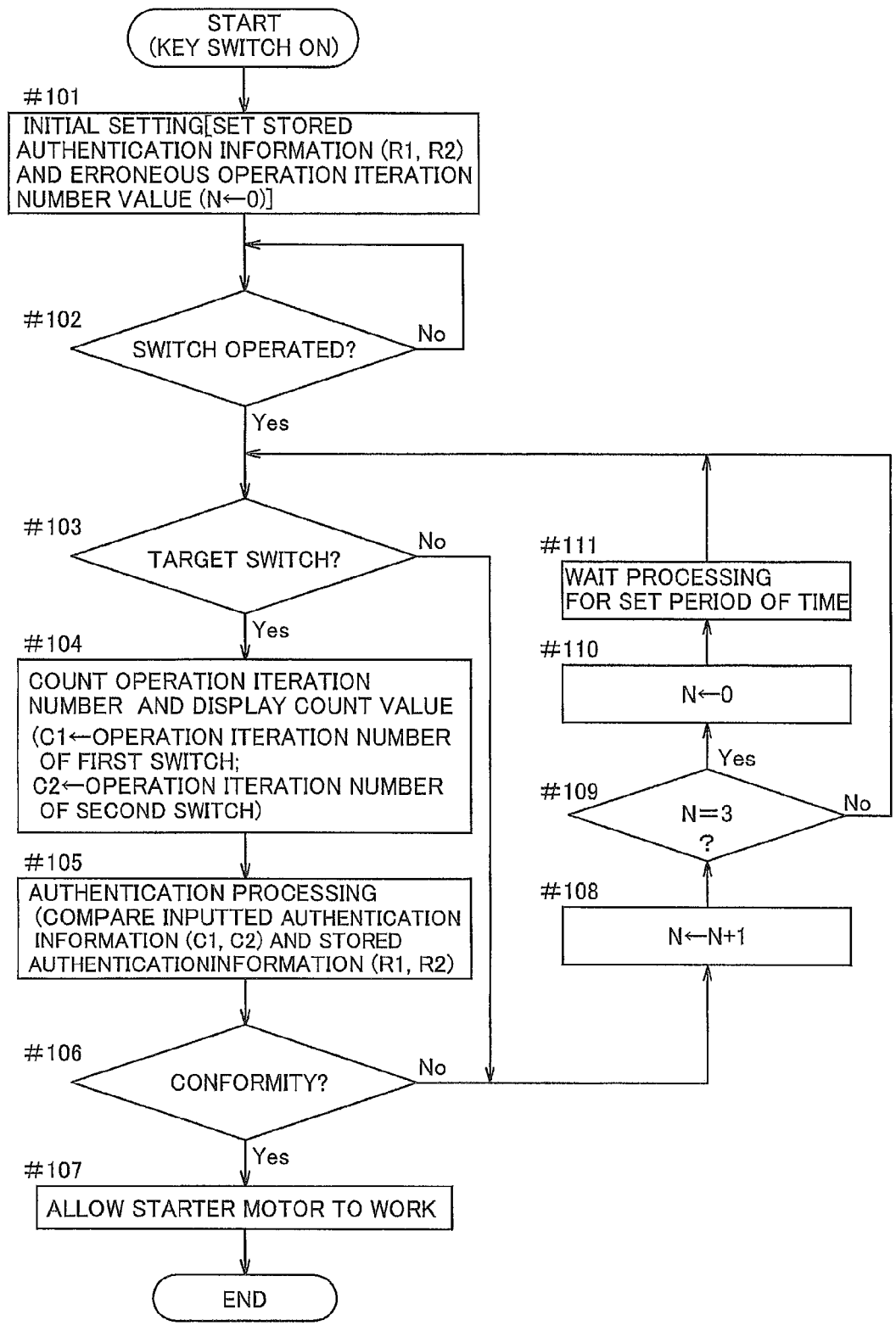

The flowchart in FIG. 17 shows the main points of the control of the authentication processing device 150. Specifically, the operator uses a key (not shown) to turn the key switch 141 to an ON position, whereby power is supplied to the authentication processing device 150 and the control is started.

During the control after the initial setting, when a target switch (either the first switch 146 or the second switch 147) is lightly (shallowly) operated, the counting means 153 counts up the number of operation iterations, and the operation iteration number displaying means 157 displays the count value on the display 136 (see steps #101 to #104 and FIG. 18).

When the counting means 153 counts the number of operation iterations, the number of operation iterations each of the first stage switch parts of the first switch 146 and the second switch 147 is counted, and the number of operation iterations is acquired as inputted authentication information. In the following description, it is supposed, as the inputted authentication information, that the number of operation iterations (C1) is the number of iterations of the first switch 146 and the number of operation iterations (C2) is the number of iterations of the second switch 147.

At the initial setting, the stored authentication information (R1, R2) is programmed to be set and "0" is set (programmed) to an erroneous operation iteration number value (N), and these are stored in a memory 151. The value of R1 and the value of R2 in the stored authentication information (R1, R2) are positive integers, at least one of the value of R1 or the value of R2 being set to "2" or more; and the stored authentication information (R1, R2) also includes the sequence of the operations of the switches. Accordingly, if the value of R1 is "2" and the value of R2 is "3", for example, then, even when the value of the number of operation iterations (C1) is "2" and the value of the number of operation iterations (C2) is "3", no authentication is made if the second switch 147 is operated first and the first switch 146 is operated later (that is, if the inputted sequence is in reverse).

In step #104, the counting means 153 counts the number of operation iterations (C1) of the first switch 146 and the number of operation iterations (C2) of the second switch 147, and stores these numbers into a buffer or the like. When the numbers of operation iterations (C1, C2) are counted, the sequence of the operations of the first switch 146 and the second switch 147 is also stored. In case of this control mode, no authentication is made if the input sequence of the first switch 146 and the second switch 147 is in reverse. Instead thereof, authentication may be made even if the input sequence is in reverse.

The count values (the number of operation iterations C1, C2) of the counting means 153 are sent to the display controlling means 154, and when the number of operation iterations (C1) of the first switch 146 is counted by the counting means 153, the display controlling means 154 displays the count screen as shown in FIG. 18 on the display 136. The count screen corresponding to the first switch 146 has an upper stage thereof defining a message region 136M for displaying a message to prompt an operator's input; and a lower stage thereof defining a bar display region 136P in which a plurality of display points are lined up in the lateral direction in the form of a progress bar to be displayed in solid white when no input has yet been made, and also defining a numeric value display region 136Q for displaying the number of operation iterations (count value C1) in a numeric figure.

When the first switch 146 is operated, as shown in FIG. 18(a), each time an operation is made, the display point of the number corresponding to the number of operation iterations (count value C1) is changed to be displayed in solid black in the direction of an arrow indicated by "U" in the FIG. 18(a), i.e. from left toward right, on the bar display region 136P. At the same time, the number of operation iterations (count value C1) is displayed in a digital number on the numeric value display region 136Q.

When the number of operation iterations (C2) of the second switch 147 is counted, the display controlling means 154 displays the count screen as shown in FIG. 18 on the display 136. The count screen corresponding to the second switch 147 has an upper stage thereof defining a message region 136M for displaying a message to prompt an operator's input; and a lower stage thereof defining a bar display region 136P in which a plurality of display points are lined up in the lateral direction in the form of a progress bar to be displayed in solid black when no input has yet been made, and also defining a numeric value display region 136Q for displaying the number of operation iterations (count value C2) in a numeric figure.

When the second switch 147 has been operated, as shown in FIG. 18(b), each time an operation is made, the display point of the number corresponding to the number of operation iterations (count value C2) is changed to be displayed in a solid white in the direction of an arrow indicated by "D" in FIG. 18(b), i.e. from right toward left, on the bar display region 136P. At the same time, the number of operation iterations (count value C2) is displayed in a digital number on the numeric value display region 136Q.

In other words, when the first switch 146 is operated, the display points of the bar display region 136P are switched one by one to a solid black display from the left side with each operation; and the number of display points in a solid black display increases together with the number of operation iterations (C1), and the numeric value on the numeric value display region 136Q also increases. On the other hand, when the second switch 147 is operated, the display points of the bar display region 136P are switched one by one to a solid white display from the right side with each operation; and the number of display points in a solid white display increases (the solid black display decreases) together with the number of operation iterations (C2), and the numeric value on the numeric value display region 136Q also increases. This makes it possible for the operator to visually understand the number of operation iterations (C1) of the first switch and the number of operation iterations (C2) of the second switch 147.

Incidentally, the count screen is not limited to a progress bar display and a digital numeric value display in combination as described above. Instead thereof, the count screen may display a character or word indicative of a numeric value. In particular, in such control, the count screen may be displayed even when the operation sequence between the first switch 146 and the second switch 147 is in reverse, such that it is impossible to analyze the correctness of the operation sequence from presence/absence of the display on the count screen.

In step #105, the authentication information identifying means 155 compares the inputted authentication information (C1, C2) which includes the number of operation iterations (C1) of the first switch 146 and the number of operation iterations (C2) of the second switch (C2), with the stored authentication information (R1, R2). When the comparison determined that the stored authentication information (R1, R2) and the inputted authentication information (C1, C2) are identical, then power supply to the starter motor 149 is permitted from the power control unit 148 (steps #106, #107).

When the conformity is determined in this manner, the display 136 is switched to a standard display mode suitable for working, and when the key switch 141 is operated to the start position, the power control unit 148 permits power supply to the starter motor 149 and starts up the engine 104. In the standard display mode, a basic information display region 136A indicative of the speed change stage of the main speed change lever 127, the travel speed and the current point in time is displayed on the upper stage of the display 136, and a set information display region 136B indicative of the set information is displayed on the lower stage of the display 136.

On the other hand, if the control determined that a switch other than a target switch (the first switch 146 or the second switch 147) has been operated, or if the authentication processing determined that there is no conformity between the stored authentication information (R1, R2) and the inputted authentication information (C1, C2), then the number of erroneous operations (N) is incremented by one; and if the number of erroneous operations (N) reaches "3," then the authentication restricting means 156 performs the wait processing for a set period of time, such that no authentication processing is performed during the period of time of the wait processing (steps #106, and #108 through #111).

In other words, when the authentication information identifying means 155 has determined, for a set number of times of consecutive iterations, that the inputted authentication information (C1, C2) is not identical to the stored authentication information (R1, R2), then a restriction mode is produced in which the authentication restricting means 156 allows no authentication to be performed in the authentication processing device 150 until the set period of time elapses thereafter. Specifically, if a switch other than a target switch (the first switch 146 or the second switch 147) has been operated, or if the number of operation iterations (C1) of the first switch 146 and the number of operation iterations (C2) of the second switch 147 are not identical to the stored authentication information (R1, R2) even if the target switches have been operated, or if the operation sequences of the first switch 146 and the second switch 147 are different, then, at a point in time where the number of such erroneous operations reaches three (3), the authentication restricting means 156 restricts processing by the authentication information identifying means 155 until the set period of time has elapsed, whereby authentication by frequently performing operations at random is prevented.

(Functions and Effects of the Embodiments)

As described above, in the present invention, since the authentication is performed by operating the two switches i.e. the first switch 146 and the second switch 147, for a set number of operation iterations in a set sequence, the precision of the authentication is enhanced thanks to increase in the number of combinations of numbers of operation iterations, so that even though only two switches are used, high precision of authentication is achieved, thus preventing theft. Further, when the first switch 146 and the second switch 147 have been operated, the number of operation iterations can be visually checked by the display 136. Therefore, the number of erroneous operations is reduced. Moreover, when the first switch 146 and the second switch 147 are operated, the screen is switched, and the display aspect of the number of operation iterations also is switched, and therefore erroneous operations can be favorably eliminated.

As described above, in the present invention, when the numbers of operation iterations (C1, C2) of the first switch 146 and the second switch 147 are correct, it is also possible to set the control mode such that the operation sequence of the first switch 146 and the second switch 147 is not set. When the control mode has been set in this manner, there is no need for the operator to store the operation sequence of the first switch 146 and the second switch 147, and it becomes possible to perform authentication without greatly lowering the precision of the authentication.

Further, the single operational tool 145 is used to operate the two switches. Thus, one end part of the operational tool 145 is operated and thereafter the other end part is operated when an authentication is to be performed. This allows for rapid operation of the switches and for a curtailed operation time for the authentication.

In particular, if an incorrect switch has been operated, if the number of operation iterations (C1) of the first switch 146 or the number of operation iterations (C2) of the second switch 147 is incorrect, or if the sequence of operation of the first switch 146 and the second switch 147 is incorrect, and if such cases occur three times, then authentication is temporarily stopped. Therefore, even when a person attempting to steal the work vehicle inputs authentication information (the inputted authentication information) at random, for example, the number of input iterations of the authentication information (the inputted authentication information) is restricted, rendering it difficult to input authentication information (inputted authentication information) which is identical to the stored authentication information, thus enhancing performance in preventing theft.

[Modifications of the Second Embodiment]

As described above, the present invention can be applied to a device for allowing an engine to be started up after an authentication in a work vehicle provided with two switches.

Other than the foregoing embodiment as described above, the present invention may also be configured as follows.

(a) The first switch 146 and the second switch 147 are not limited to those used also for the cruise control. Instead thereof, two switching switches for switching between a high speed and a low speed of the stepless speed change device 108, or two switches having entirely different control targets, may also be used.

(b) The operational tool for operating the two switches is not limited to one acting in a seesaw manner. Instead thereof, the operational tool may be a lever pivotable around a predetermined swing axis, or one slidable in a straight line.

(c) The mode of the inputted authentication information is not limited to one described in the foregoing embodiment. Instead of a single input rotation including a set number of input iterations of the first switch 146 and a set number of subsequent input iterations of the second switch 147, at least one of the first switch 146 and the second switch 147 may be sufficient, or at least twice such a rotation may be required, for the inputted authentication information. As a further modification, the inputted authentication information may require a set number of input iterations of the first switch 146, a set number of input iterations of the second switch 147 subsequent thereto, and again a set number of input iterations of the first switch 146. Setting the operation sequence in this manner dramatically improves the precision of the authentication and also enhances the efficacy of the theft prevent even though only two switches are being used.

(d) An authentication information storing mode and the like for allowing the operator to set the stored authentication information may be provided also. During the control of such an authentication information storing mode, not only the number of operation iterations of the first switch 146 and the number of operation iterations of the second switch 147 but also the sequence of the operations of the two switches may be set as desired, for example. This makes it possible to periodically change the stored authentication information, and possible to further enhance the efficacy of the theft prevention.

What is claimed is:

1. A work vehicle comprising:
   a display; and
   an information displaying device, the information displaying device including:
      a setting information processing unit for displaying, on the display, a setting screen selected from among a plurality of set screens corresponding to a plurality of information items, and for changing the set information corresponding to the selected setting screen; and
      operation information discriminating means for determining a first operation information item and a second operation information item inputted by a manual operation;
   wherein the setting information processing unit includes: setting screen displaying means for displaying the setting screen on the display; and setting information changing means for allowing changing of the set information when the setting screen is displayed on the display;
   wherein, when the operation information discriminating means determines that the first operation information item is inputted, the setting screen displaying means performs display processing in a transition display mode for sequentially switching to, and displaying one of the plurality of set screens on the display each time an input is determined; and
   wherein, when the operation information discriminating means determines that the second operation information item is inputted during display in the transition display mode, the setting information changing means performs a process for moving to an information change mode for allowing changing of the set information corresponding to the setting screen being displayed on the display; and
   when the operation information discriminating means determines that the second operation information item is inputted during the information change mode, the setting information changing means performs a process for restoring the transition display mode from the information change mode.

2. The work vehicle according to claim 1, wherein
   when the operation information discriminating means determines that the first operation information item is inputted during the information change mode, the setting information changing means changes the set information corresponding to the setting screen each time an input is determined.

3. The work vehicle according to claim 1, further comprising:
   storage means;
   wherein, when the operation information discriminating means determines that the second operation information item is inputted during the information change mode, the set information changed during the information change mode is stored into the storage means.

4. The work vehicle according to claim, further comprising:
   a push switch;
   wherein the operation information discriminating means determines if the first operation information item is inputted or not when a period of time of operation by the push switch is less than a set of period of time, and determines if the second operation information item is inputted or not when the period of time of operation by the push switch is the set of period of time or longer.

5. The work vehicle according to claim 1, further comprising:
   a first switch; and
   a second switch;
   wherein the operation information discriminating means determines if the first operation information item is inputted or not when the first switch is operated, and determines if the second operation information item is inputted or not when the second switch is operated.

6. The work vehicle according to claim 1, further comprising:
   a first switch;
   a second switch; and
   a single operational tool for operating the first switch and the second switch;
   wherein the operation information discriminating means determines if the first operation information item is inputted or not when the first switch is operated by the operational tool, and determines if the second operation information item is inputted or not when the second switch is operated by the operational tool.

* * * * *

UNITED STATES PATENT AND TRADEMARK OFFICE
CERTIFICATE OF CORRECTION

PATENT NO.        : 8,626,407 B2                                Page 1 of 1
APPLICATION NO.   : 13/424446
DATED             : January 7, 2014
INVENTOR(S)       : Hiroo Fujimoto It is certified that error appears in the above-identified patent and that said Letters Patent is hereby corrected as shown below:

In the Claims

Column 26, Line 31, Claim 4, delete "claim," and insert -- claim 1, --

Signed and Sealed this
Sixth Day of May, 2014

Michelle K. Lee
*Deputy Director of the United States Patent and Trademark Office*